United States Patent
Yeh et al.

(10) Patent No.: US 12,241,740 B2
(45) Date of Patent: Mar. 4, 2025

(54) OPTICAL SENSING APPARATUS WITH DEACTIVATED PHOTODETECTOR REGIONS AND METHOD THEREOF

(71) Applicant: Artilux, Inc., Menlo Park, CA (US)

(72) Inventors: Chih-Wei Yeh, Hsinchu County (TW); Yun-Chung Na, San Jose, CA (US); Tsung-Ting Wu, Hsinchu County (TW); Shu-Lu Chen, Hsinchu County (TW)

(73) Assignee: ARTILUX, INC., Menlo Park, CA (US)

( * ) Notice: Subject to any disclaimer, the term of this patent is extended or adjusted under 35 U.S.C. 154(b) by 639 days.

(21) Appl. No.: 17/470,484

(22) Filed: Sep. 9, 2021

(65) Prior Publication Data
US 2022/0136817 A1    May 5, 2022

Related U.S. Application Data

(60) Provisional application No. 63/226,761, filed on Jul. 29, 2021, provisional application No. 63/223,056, filed on Jul. 18, 2021, provisional application No. 63/192,105, filed on May 24, 2021, provisional application No. 63/108,449, filed on Nov. 2, 2020.

(51) Int. Cl.
G06T 7/11      (2017.01)
G01B 9/02      (2022.01)

(52) U.S. Cl.
CPC .......... G01B 9/02083 (2013.01); G06T 7/11 (2017.01)

(58) Field of Classification Search
CPC .......... G06T 2207/20104; G06T 7/00; G06T 2211/412; G06V 10/25; G06V 40/1388; G06V 10/147
See application file for complete search history.

(56) References Cited

U.S. PATENT DOCUMENTS 5,262,871 A * 11/1993 Wilder .............. H04N 25/76
                                                  348/E3.018
6,341,024 B1 * 1/2002 Jeong .............. H04B 10/07955
                                                  398/87
(Continued)

FOREIGN PATENT DOCUMENTS

CN     111060002 A  *  4/2020  .......... G01B 11/002
EP       1686789          8/2006
JP      2003219259        7/2003

OTHER PUBLICATIONS

Partial Search Report for European Application No. 21203733.7, mailed Feb. 17, 2022, 13 pages.

*Primary Examiner* — Guillermo M Rivera-Martinez
(74) *Attorney, Agent, or Firm* — Dority & Manning, P.A.

(57) ABSTRACT

Systems, apparatuses, and methods for improved reconfigurable optical sensing are provided. For instance, an example optical sensing apparatus can include a photodetector array including a plurality of photodetectors. The optical sensing apparatus can include circuitry or one or more processing devices configured to receive one or more electrical signals representing an optical signal received by a first subset of the plurality of photodetectors; determine, based on the one or more electrical signals, a region of interest in the photodetector array for optical measurements; and deactivate, based on the region of interest, a second subset of the plurality of photodetectors of the photodetector array.

16 Claims, 18 Drawing Sheets

(56) References Cited

U.S. PATENT DOCUMENTS

| | | | |
|---|---|---|---|
| 6,690,493 B1* | 2/2004 | Kobayashi | H04N 25/443 348/307 |
| 2002/0139853 A1* | 10/2002 | Tsikos | G06K 7/10 235/462.01 |
| 2005/0151864 A1* | 7/2005 | Anderson | H04N 23/71 348/294 |
| 2006/0170801 A1* | 8/2006 | Dennis | H04N 25/68 348/E3.02 |
| 2007/0131775 A1* | 6/2007 | Zhu | G06K 7/10881 235/472.01 |
| 2008/0001076 A1* | 1/2008 | Cresens | G01T 1/2012 250/252.1 |
| 2008/0008472 A1* | 1/2008 | Dress | H04B 10/803 398/118 |
| 2008/0187241 A1* | 8/2008 | Talati | G06V 10/25 382/282 |
| 2011/0176069 A1* | 7/2011 | Chamberlin | H04N 9/3194 348/E5.143 |
| 2015/0358571 A1* | 12/2015 | Dominguez Castro | H04N 25/771 348/308 |
| 2016/0327433 A1* | 11/2016 | Margalit | G01J 3/0224 |
| 2016/0356712 A1* | 12/2016 | Ran | G02B 3/005 |
| 2017/0038459 A1* | 2/2017 | Kubacki | G01J 1/0204 |
| 2017/0205283 A1* | 7/2017 | Wyles | G01J 1/44 |
| 2017/0257588 A1* | 9/2017 | Zhou | H04N 23/60 |
| 2017/0294173 A1* | 10/2017 | Sun | G06F 3/0304 |
| 2018/0113200 A1* | 4/2018 | Steinberg | G01S 17/10 |
| 2018/0143324 A1* | 5/2018 | Keilaf | G01S 7/4812 |
| 2018/0233521 A1* | 8/2018 | Na | G01S 7/4914 |
| 2018/0283854 A1* | 10/2018 | Munro | G01C 15/002 |
| 2019/0107627 A1* | 4/2019 | Tian | G01S 17/06 |
| 2019/0146071 A1* | 5/2019 | Donovan | G01S 17/89 |
| 2019/0354894 A1* | 11/2019 | Lazovich | G06E 1/00 |
| 2020/0014463 A1* | 1/2020 | Tanaka | H03F 1/3211 |
| 2020/0200877 A1* | 6/2020 | Yoo | G01S 7/4817 |
| 2020/0312406 A1* | 10/2020 | Sharma | G11C 11/54 |
| 2021/0011128 A1* | 1/2021 | Shi | G01S 17/08 |
| 2021/0377465 A1* | 12/2021 | Mandelli | H04N 25/44 |

* cited by examiner

OPTICAL SENSING APPARATUS WITH DEACTIVATED PHOTODETECTOR REGIONS AND METHOD THEREOF

RELATED APPLICATIONS

The present application claims filing benefit of U.S. Provisional Patent Application Ser. No. 63/108,449, having a filing date of Nov. 2, 2020, U.S. Provisional Patent Application Ser. No. 63/192,105, having a filing date of May 24, 2021, U.S. Provisional Patent Application Ser. No. 63/223,056, having a filing date of Jul. 18, 2021, and U.S. Provisional Patent Application Ser. No. 63/226,761, having a filing date of Jul. 29, 2021, each of which is incorporated herein by reference in its entirety.

FIELD

The present disclosure relates generally to sensor systems. In particular, the present disclosure provides a reconfigurable optical sensing apparatus and related method to optimize and enhance the optical measurement.

BACKGROUND

Sensors are being used in many applications, such as smartphones, robotics, and autonomous vehicles, etc. to determine characteristics (e.g., object recognition, object classification, depth information, edge detection, motion information, etc.) of objects in an environment. When developing a sensor, however, some problems or issues may need to be solved, such as interference, optical signal, power consumption, wavelength of the optical signal, and/or alignment of the photodetectors with other passive optical components (e.g., focusing lens, casing, etc.).

SUMMARY

Aspects and advantages of embodiments of the present disclosure will be set forth in part in the following description, or may be learned from the description, or may be learned through practice of the embodiments.

One example aspect of the present disclosure is directed to an optical sensing apparatus. The optical sensing apparatus can include a photodetector array including a plurality of photodetectors. The optical sensing apparatus can include circuitry or one or more processing devices configured to receive one or more electrical signals representing an optical signal received by a first subset of the plurality of photodetectors; determine, based on the one or more electrical signals, a region of interest in the photodetector array for optical measurements; and deactivate, based on the region of interest, a second subset of the plurality of photodetectors of the photodetector array.

In some implementations, determining the region of interest in the photodetector array further includes determining, based on the one or more electrical signals, a ROI-center photodetector of the first subset of the plurality of photodetectors representing a center of the region of interest.

In some implementations, determining the ROI-center photodetector further includes determining the ROI-center photodetector based on a distribution of electrical signal strengths across the first subset of plurality of photodetectors generated in response to receiving the optical signal.

In some implementations, determining the region of interest in the photodetector array further includes determining, based on the one or more electrical signals, a size of the region of interest in the photodetector array.

In some implementations, determining the size of the region of interest in the photodetector array further includes determining the size of the region of interest based on a distribution of electrical signal strengths across the first subset of plurality of photodetectors generated in response to receiving the optical signal.

In some implementations, determining the region of interest in the photodetector array further includes dynamically changing the region of interest in response to an optical signal received by the photodetector array.

In some implementations, the plurality of photodetectors includes a third subset of photodetectors representing a region for receiving an interference optical signal.

In some implementations, the first subset of photodetectors and the third subset of photodetectors include one or more common photodetectors representing an overlap between a portion of the region of interest and a portion of the region for receiving the interference optical signal.

In some implementations, the circuitry or the one or more processing devices are further configured to: receive one or more interference electrical signals representing the interference optical signal received by the third subset of the plurality of photodetectors; determine one or more calibrated electrical signals based on (i) the one or more electrical signals representing the optical signal received by the first subset of the plurality of photodetectors and (ii) the one or more interference electrical signals; and provide the one more calibrated electrical signals for output.

In some implementations, the optical sensing apparatus is configured to provide an output for a proximity sensing application, a gesture recognition application, or a three-dimensional imaging application.

In some implementations, each photodetector of the photodetector array comprises a light-absorption material including germanium.

In some implementations, the plurality of photodetectors include a third subset of photodetectors representing a region for receiving an optical signal having different wavelength with the optical signal received by the first subset of the plurality of photo detectors.

Another example aspect of the present disclosure is directed to an optical sensing apparatus. The optical sensing apparatus can include a photodetector array. The photodetector array can include a first ROI, including one or more first photodetectors, configured to detect a first optical signal reflected from a target object and output one or more first electrical signals. The photodetector array can include a second ROI, including one or more second photodetectors, configured to detect a second optical signal reflected from a non-target object and output one or more second electrical signals. The optical sensing apparatus can include circuitry configured to: process the one or more first electrical signals and the one or more second electrical signals to generate one or more calibrated electrical signals; and output the one or more calibrated electrical signals.

In some implementations, the photodetector array further includes a deactivated region, including one or more third photodetectors, configured to be deactivated during operation.

In some implementations, the first ROI and the second ROI are partially overlapped, and the one or more second photodetectors include at least one photodetector of the one or more first photodetectors.

In some implementations, the non-target object is a reflecting-surface of the optical sensing apparatus.

In some implementations, the one or more first electrical signals include one or more first optical currents and the one or more second electrical signals include one or more second optical currents. The circuitry includes an analog-to-digital converter circuitry coupled to the photodetector array and configured to convert the one or more first optical currents to one or more first digital output signals; and convert the one or more second optical currents to one or more second digital output signals. The circuitry includes a calculation module, coupled to the analog-to-digital converter circuitry, configured to determine the one or more calibrated electrical signals based on the one or more first digital output signals and the one or more second digital output signals.

In some implementations, the analog-to-digital converter circuitry includes a transimpedance amplifier coupled to the photodetector array, configured to convert the first one or more optical currents to one or more first analog output signals, and convert the one or more second optical currents to one or more second analog output signals. The analog-to-digital converter circuitry further includes an analog-to-digital convertor, coupled to the transimpedance amplifier, configured to convert the one or more first analog output signals to the one or more first digital output signals, and convert the one or more second analog output signals to the one or more second digital output signals.

In some implementations, the optical sensing apparatus further includes a switching array and the transimpedance amplifier is coupled to the photodetector array through the switching array.

In some implementations, the switching array includes one or more first switches, coupled to the one or more first photodetectors, configured to selectively output one or more of the one or more first optical currents to the transimpedance amplifier. The switching array further includes one or more second switches, coupled to the one or more second photodetectors, configured to selectively output one or more of the one or more second optical currents to the transimpedance amplifier.

In some implementations, the optical sensing apparatus includes a current meter, coupled between the transimpedance amplifier and the switching array, configured to measure the one or more first optical currents and the one or more second optical currents.

In some implementations, the analog-to-digital converter circuitry converts the one or more first optical currents at a first time period and converts the one or more second optical currents at a second time period.

In some implementations, a location of the first ROI and a location of the second ROI are determined during operation of the optical sensing apparatus.

In some implementations, each photodetector of photodetector array includes a light-absorption material including germanium.

Another example aspect of the present disclosure is directed to an optical sensing method. The method includes receiving one or more electrical signals representing an optical signal received by a first subset of a plurality of photodetectors of a photodetector array. The method includes determining, based on the one or more electrical signals, a region of interest in the photodetector array for optical measurements. The method includes deactivating, based on the region of interest, a second subset of the plurality of photodetectors of the photodetector array.

In some implementations, determining the region of interest in the photodetector array further includes determining, based on the one or more electrical signals, a ROI-center photodetector of the first subset of the plurality of photodetectors representing a center of the region of interest.

In some implementations, determining the ROI-center photodetector further includes determining the ROI-center photodetector based on a distribution of electrical signal strengths across the first subset of plurality of photodetectors generated in response to receiving the optical signal.

In some implementations, determining the region of interest in the photodetector array further includes determining, based on the one or more electrical signals, a size of the region of interest in the photodetector array.

In some implementations, determining the size of the region of interest in the photodetector array further includes determining the size of the region of interest based on a distribution of electrical signal strengths across the first subset of the plurality of photodetectors generated in response to receiving the optical signal.

In some implementations, determining the region of interest in the photodetector array further includes dynamically changing the region of interest in response to an optical signal received by the photodetector array.

In some implementations, the plurality of photodetectors include a third subset of photodetectors representing a region for receiving an interference optical signal.

In some implementations, the first subset of photodetectors and the third subset of photodetectors include one or more common photodetectors representing an overlap between a portion of the region of interest and a portion of the region for receiving the interference optical signal.

Another example aspect of the present disclosure is directed to an optical sensing apparatus that includes a substrate; one or more pixels supported by the substrate, where each of the pixel comprises an absorption region supported by the substrate, and where the absorption region configured to receive an optical signal and generate photo-carriers in response to receiving the optical signal; one or more lenses over the respective pixel of the one or more pixels, where the one or more lenses are composed of a first material having a first refractive index; and an encapsulation layer over the one or more lenses and composed of a second material having a second refractive index between 1.3 to 1.8, where a difference between the first refractive index and the second refractive index is above an index threshold such that a difference between an effective focal length of the one or more lenses and a distance between the one or more lenses and the one or more pixels is within a distance threshold.

In some implementations, the first refractive index of the one or more lenses is not less than 3, where the difference between the first refractive index and the second refractive index of the encapsulation layer is not less than 0.5.

In some implementations, the optical sensing apparatus can include a first planarization layer between the encapsulation layer and the one or more lenses, where the first planarization layer is composed of a third material having a third refractive index that is within a threshold from the second refractive index.

In some implementations, the optical sensing apparatus can include a first anti-reflection layer between the one or more lenses and the first planarization layer, where the first anti-reflection layer is composed of a fourth material having a fourth refractive index between the third refractive index of the first planarization layer and the first refractive index of the one or more lenses.

In some implementations, the optical sensing apparatus can include a filter layer between the first planarization layer and the encapsulation layer, where the filter layer is configured to pass optical signal having a specific wavelength range.

In some implementations, the optical sensing apparatus can include a second planarization layer between the one or more lenses and the substrate.

In some implementations, the first planarization layer or the second planarization layer is composed of a material comprising polymer having a refractive index between 1 and 2.

In some implementations, the optical sensing apparatus can include a second anti-reflection layer between the first planarization layer and the encapsulation layer, where the second anti-reflection layer is composed of a sixth material having a sixth refractive index between the second refractive index of the encapsulation layer and the third refractive index of the first planarization layer.

In some implementations, the optical sensing apparatus can include a filter layer between the one or more lenses and the one or more pixels, where the filter layer is configured to pass optical signal having a specific wavelength range.

In some implementations, the optical sensing apparatus can include a second planarization layer between the filter layer and the substrate.

In some implementations, the optical sensing apparatus can include a carrier substrate and an integrated circuit layer between the one or more pixels and the carrier substrate, where the integrated circuit layer includes a control circuit configured to control the one or more pixels.

In some implementations, the substrate is composed of a material comprising silicon. In some implementations, the absorption region is composed of a material comprising germanium.

Another example aspect of the present disclosure is directed to an optical sensing apparatus that includes a substrate; one or more pixels supported by the substrate, where each of the pixel comprises an absorption region supported by the substrate, and where the absorption region is configured to receive an optical signal and generate photo-carriers in response to receiving the optical signal; one or more lenses over the respective pixel of the one or more pixels, where the one or more lenses are composed of a first material having a first refractive index; an encapsulation layer over the one or more lenses and composed of a second material having a second refractive index lower than the first refractive index; and a first planarization layer between the encapsulation layer and the one or more lenses and composed of a third material having a third refractive index that is within a threshold from the second refractive index.

In some implementations, the optical sensing apparatus can further include a first anti-reflection layer between the one or more lenses and the encapsulation layer, where the first anti-reflection layer is composed of a fourth material having a fourth refractive index between the third refractive index of the first planarization layer and the first refractive index of the one or more lenses.

In some implementations, the optical sensing apparatus can further include a filter layer between the first planarization layer and the encapsulation layer, where the filter layer is configured to pass optical signal having a specific wavelength range.

In some implementations, the optical sensing apparatus can further include a second planarization layer between the one or more lenses and the substrate. In some implementations, the first planarization layer or the second planarization layer is composed of a material comprising polymer having a refractive index between 1 and 2.

In some implementations, the optical sensing apparatus can further include a second anti-reflection layer between the first planarization layer and the encapsulation layer, where the second anti-reflection layer is composed of a sixth material having a sixth refractive index between the second refractive index of the encapsulation layer and the third refractive index of the first planarization layer.

In some implementations, the optical sensing apparatus can further include a filter layer between the one or more lenses and the one or more pixels, where the filter layer is configured to pass optical signal having a specific wavelength range.

In some implementations, the optical sensing apparatus can further include a second planarization layer between the filter layer and the substrate.

In some implementations, the optical sensing apparatus can further include a carrier substrate and an integrated circuit layer between the one or more pixels and the carrier substrate, where the integrated circuit layer comprises a control circuit configured to control the one or more pixels.

In some implementations, the first refractive index of the one or more lenses is not less than 3. In some implementations, a difference between the first refractive index of the one or more lenses and the second refractive index of the encapsulation layer is not less than 0.5. In some implementations, a difference between the third refractive index of the first planarization layer and the first refractive index of the one or more lenses is not less than 0.5.

In some implementations, the absorption regions of the one or more pixels are at least partially embedded in a substrate. In some implementations, the one or more pixels are multiple pixels arranged in one-dimensional and two-dimensional.

Another example aspect of the present disclosure is directed to an optical sensing apparatus that includes a substrate; one or more pixels supported by the substrate, where each of the pixel comprises an absorption region supported by the substrate, and where the absorption region is configured to receive an optical signal and generate photo-carriers in response to receiving the optical signal; one or more lenses over the respective pixel of the one or more pixels, where the one or more lenses are composed of a first material having a first refractive index; a first planarization layer over the one or more lenses and composed of a second material having a second refractive index, where a difference between the second refractive index and the first refractive index is not less than 0.5.

Another example aspect of the present disclosure is directed to an optical sensing apparatus that includes a substrate; one or more pixels supported by the substrate, where each of the pixel comprises an absorption region supported by the substrate, and where the absorption region is configured to receive an optical signal and generate photo-carriers in response to receiving the optical signal; one or more lenses over the respective pixel of the one or more pixels, where the one or more lenses are composed of a first material having a first refractive index; a layer directly formed over the one or more lenses and composed of a second material having a second refractive index, where a difference between the second refractive index and the first refractive index is not less than 0.5.

Another example aspect of the present disclosure is directed to an optical sensing apparatus that includes a photodetector. The photodetector includes a first substrate comprising a first material; an absorption region formed on or at least partially in the first substrate, where the absorption region comprises a second material, and where the absorption region is configured to receive an optical signal and to generate a photo-current in response to receiving the optical signal; a second substrate bonded to the first substrate, where the second substrate comprises the first material; and first circuitry formed in the second substrate, where the first circuitry is configured to convert the photo-current and to an analog voltage output for processing; and a third substrate coupled to the photodetector, where the third substrate comprising second circuitry configured to process the analog voltage output to generate a digital output.

In some implementations, the absorption region comprises an array of pixels. In some implementations, the array of pixels are electrically coupled together to generate the photo-current. In some implementations, the first material comprises silicon, and wherein the second material comprises germanium.

In some implementations, the optical sensing apparatus can include a lens array configured to focus the optical signal to the array of pixels.

In some implementations, the first circuitry comprises a low-noise preamplifier configured to convert the photo-current and to a voltage output. In some implementations, the first circuitry further comprises an amplifier configured to amplify the voltage output. In some implementations, the second circuitry further comprises an analog-to-digital converter configured to convert the amplified voltage output to a digital signal. In some implementations, the second circuitry further comprises a micro-controller configured to process the digital signal.

In some implementations, the second substrate is bonded to the third substrate, the second substrate is arranged between the first substrate and the third substrate, and the first substrate is arranged to receive the optical signal. In some implementations, the third substrate is wire-bonded to the first substrate or the second substrate.

In some implementations, the optical sensing apparatus can include a light emitter coupled to the third substrate. In some implementations, the first circuitry further comprises driver circuitry for a light emitter.

In some implementations, one of more operating characteristics of the first circuitry is dependent on the absorption region, and one of more operating characteristics of the second circuitry is independent of the absorption region.

In some implementations, the digital output is used for proximity sensing, imaging, or time-of-flight sensing.

Another example aspect of the present disclosure is directed to an optical sensing apparatus that includes a first substrate comprising a first material; an absorption region formed on or at least partially in the first substrate, where the absorption region comprises a second material, and where the absorption region is configured to receive an optical signal and to generate a photo-current in response to receiving the optical signal; a second substrate bonded to the first substrate, where the second substrate comprises the first material; and first circuitry formed in the second substrate, where the first circuitry is configured to convert the photo-current and to an analog voltage output for processing.

In some implementations, the optical sensing apparatus can include a third substrate comprising second circuitry configured to process the analog voltage output to generate a digital output, where the second substrate is bonded to the third substrate, where the second substrate is arranged between the first substrate and the third substrate, and where the first substrate is arranged to receive the optical signal.

In some implementations, one of more operating characteristics of the first circuitry is dependent on the absorption region, and one of more operating characteristics of the second circuitry is independent of the absorption region.

In some implementations, the first circuitry further comprises driver circuitry for a light emitter.

Another example aspect of the present disclosure is directed to an optical sensing apparatus that includes a photodetector. The photodetector includes a first substrate comprising a first material; a pixel array having multiple pixels formed on or at least partially in the first substrate, where the pixel array comprises a second material, where the pixel array is configured to receive an optical signal and to generate a photo-current in response to receiving the optical signal, and where the multiple pixels of the array of pixels are electrically coupled together to generate the photo-current; a second substrate bonded to the first substrate, where the second substrate comprises the first material; and first circuitry formed in the second substrate, where the first circuitry is configured to convert the photo-current and to an analog voltage output for processing; and a third substrate coupled to the photodetector, where the third substrate comprising second circuitry is configured to process the analog voltage output to generate a digital output.

Other example aspects of the present disclosure are directed to systems, methods, apparatuses, sensors, computing devices, tangible non-transitory computer-readable media, and memory devices related to the described technology.

These and other features, aspects and advantages of various embodiments will become better understood with reference to the following description and appended claims. The accompanying drawings, which are incorporated in and constitute a part of this specification, illustrate embodiments of the present disclosure, and together with the description, serve to explain the related principles.

BRIEF DESCRIPTION OF THE DRAWINGS

The foregoing aspects and many of the attendant advantages of this application will become more readily appreciated by reference to the following detailed description, when taken in conjunction with the accompanying drawings, wherein.

DETAILED DESCRIPTION

Figure 1A:
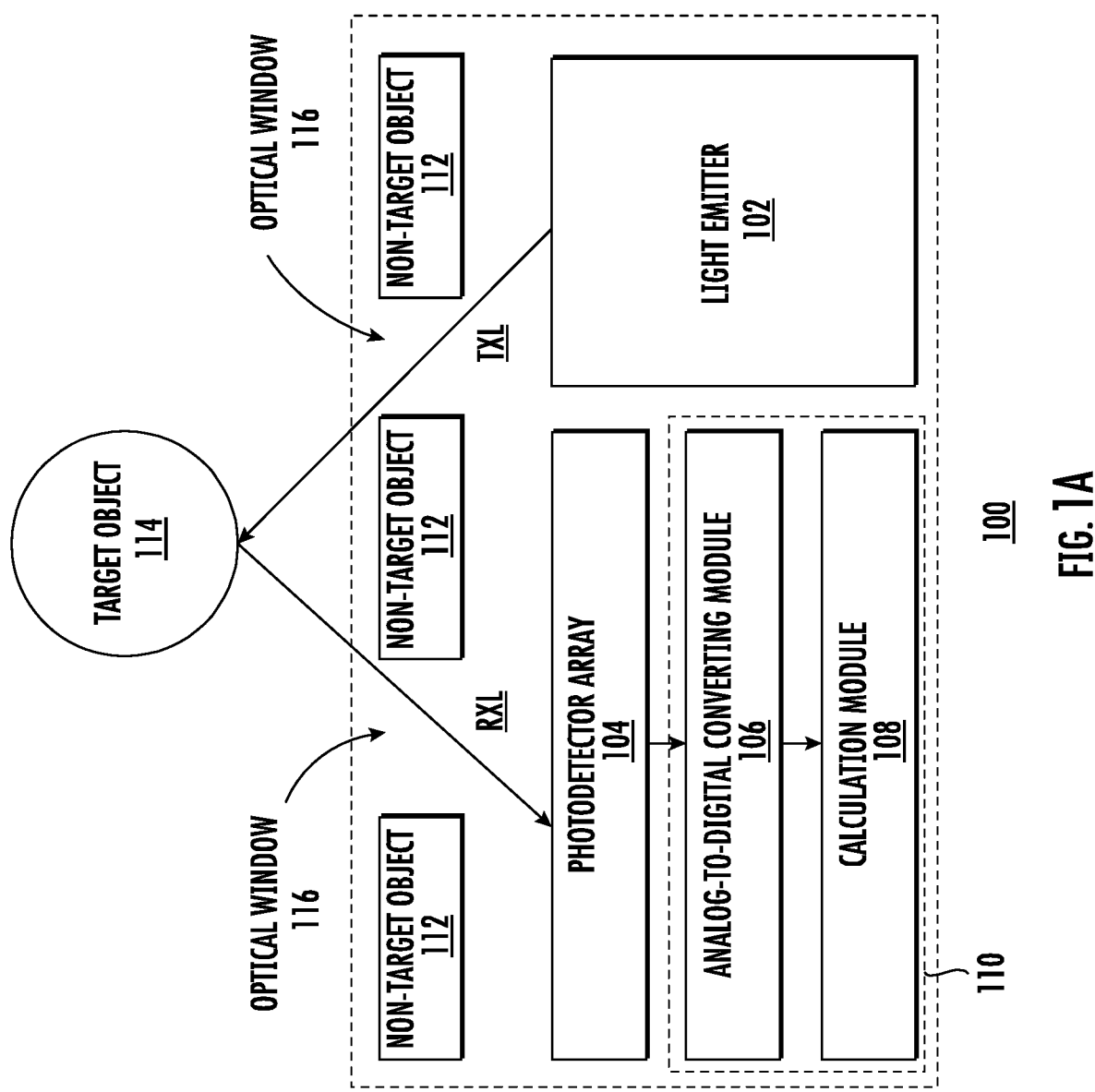
FIG. 1A depicts a block diagram of an example optical sensing apparatus according to example aspects of the present disclosure.

Example aspects of the present disclosure are directed to improved systems, methods, and apparatuses for reconfiguring optical sensing. The improved optical sensing can be implementing in a plurality of platforms to help improve the customization of an optical sensor for sensing a target object. For instance, an optical sensing apparatus (e.g., of user device) can include a photodetector array. The photodetector array can include a plurality of photodetectors. The photodetectors can include a plurality of pixels, each including a light-absorption material (e.g., germanium). A light emitter can be configured to emit an optical signal to the target object and the photodetector array can receive an optical signal reflected from the target object. The photodetector array can output electrical signal(s) (e.g., optical currents) to circuitry of the optical sensing apparatus. The optical sensing apparatus (e.g., via its circuitry) can determine a region of interest in the photodetector array and deactivate photodetectors that are outside of the region of interest. The region of interest can reflect, for example, the photodetectors (e.g., pixels) best positioned to detect the signals from the target object. The optical sensing apparatus can be configured to dynamically change the parameters (e.g., size, shape, location, etc.) of the region of interest as needed to maintain this optimization during operation. Moreover, in some implementations, the photodetector array can include more than one region of interest for detecting interference signals arising from non-targets. In this way, as further described herein, a photodetector array can be con-figured (and re-configured) in a manner to best detect wanted signals, while also filtering unwanted signals.

The systems and methods of the present disclosure provide a variety of technical effects and benefits. For instance, the technology of the present disclosure improves the ability to re-configure/customize a photodetector array based on its operating conditions. This also provides power savings as unneeded portions of the photodetector array can be deactivated. Furthermore, the dynamic reconfiguration technology can an allow the requirements of the entire optical to be relaxed, while also resulting in better interference subtraction due to the ability to customize and adjust for desired signals (e.g., during operation of the optical sending apparatus). This can lead, for example, to better implementation of under display/lens sensing. Ultimately, the technology described herein can improve optical sensing performance by allowing an apparatus/device to customize its photodetectors based on the conditions and environment of the device.

With reference to the figures, example embodiments of the present disclosure will be discussed in further detail. It should be understood that embodiments, features, hardware, software, and/or other elements described with respect to one figure can be utilized within the systems and processes of another figure.

FIG. 1A illustrates an example optical sensing apparatus 100 for sensing a target object 114. The optical sensing apparatus 100 includes a light emitter 102, a photodetector array 104, a circuitry 110 (or one or more processors) and a non-target object 112. In some embodiments, the circuitry 110 includes an analog-to-digital converting module 106 and a calculation module 108. The light emitter 102 is configured to emit an optical signal TXL to the target object 114. The photodetector array 104, including a plurality of photodetectors, is configured to receive an optical signal RXL reflected from the target object 114 and output one or more electrical signals (e.g., optical currents) to the circuitry 110. In some embodiments, the entire area of the photodetector array 104 is larger than the projection area of the optical signal RXL. The circuitry 110 can be implemented to configure a region of interest (hereinafter referred to as "ROI") for receiving the optical signal RXL on the photodetector array 104. The analog-to-digital converting module 106 is configured to perform an analog-to-digital conversion based on the one or more electrical signals (e.g., optical currents) generated from the photodetector array 104. The calculation module 108 is configured to perform a calculation and provide one or more calibrated electrical signals.

In addition, the optical sensing apparatus 100 may include one or more non-target objects 112 (e.g., case, panel or any other reflective elements) and one or more optical windows 116. Take a case as the non-target object 112 as an example, these optical windows 116 can be opened such that the optical signal TXL can be emitted from the optical sensing apparatus 100 and toward the target object 114, and the optical signal RXL can be received by the photodetector array 104. In some implementations, the non-target object 112 can be a reflecting-surface of the optical sensing apparatus 100.

In some embodiments, the optical sensing apparatus 100 can be implemented in a smartphone, glass, watch, earphone, robot, autonomous vehicle or any other electronic devices.

In some embodiments, the optical sensing apparatus 100 is configured to provide an output for a proximity sensing application, a gesture recognition application, a three-dimensional imaging application, or any other suitable sensing applications. For example, as described herein (e.g., with reference to FIG. 12), the optical sensing apparatus 100 can include a computing architecture for storing and operating a proximity sensing application, a gesture recognition application, a three-dimensional imaging application, or any other suitable sensing applications. In some implementations, this can include the use of one or more machine-learned models. The output can include data indicative of one or more signal characteristics for use by the particular application. By way of example, a proximity sensing application can include one or more machine-learned models that are trained to detect the proximity of an object based at least in part on the signal characteristics received via the photodetector array. The model(s) can provide a model output indicating the proximity of the object, which can trigger another function by the underlying device (e.g., unlocking a touch screen, etc.).

The optical sensing apparatus 100 (e.g., the circuitry or the one or more processors) can be configured to activate certain regions of photodetector array 104. As further described herein, the optical sensing apparatus 100 (e.g., the circuitry or the one or more processors) can be configured to receive one or more electrical signals representing an optical signal received by a first subset of the plurality of photodetectors, determine, based on the one or more electrical signals, a region of interest in the photodetector array for optical measurements, and deactivate, based on the region of interest, a second subset of the plurality of photodetectors of the photodetector array.

Figure 1B:
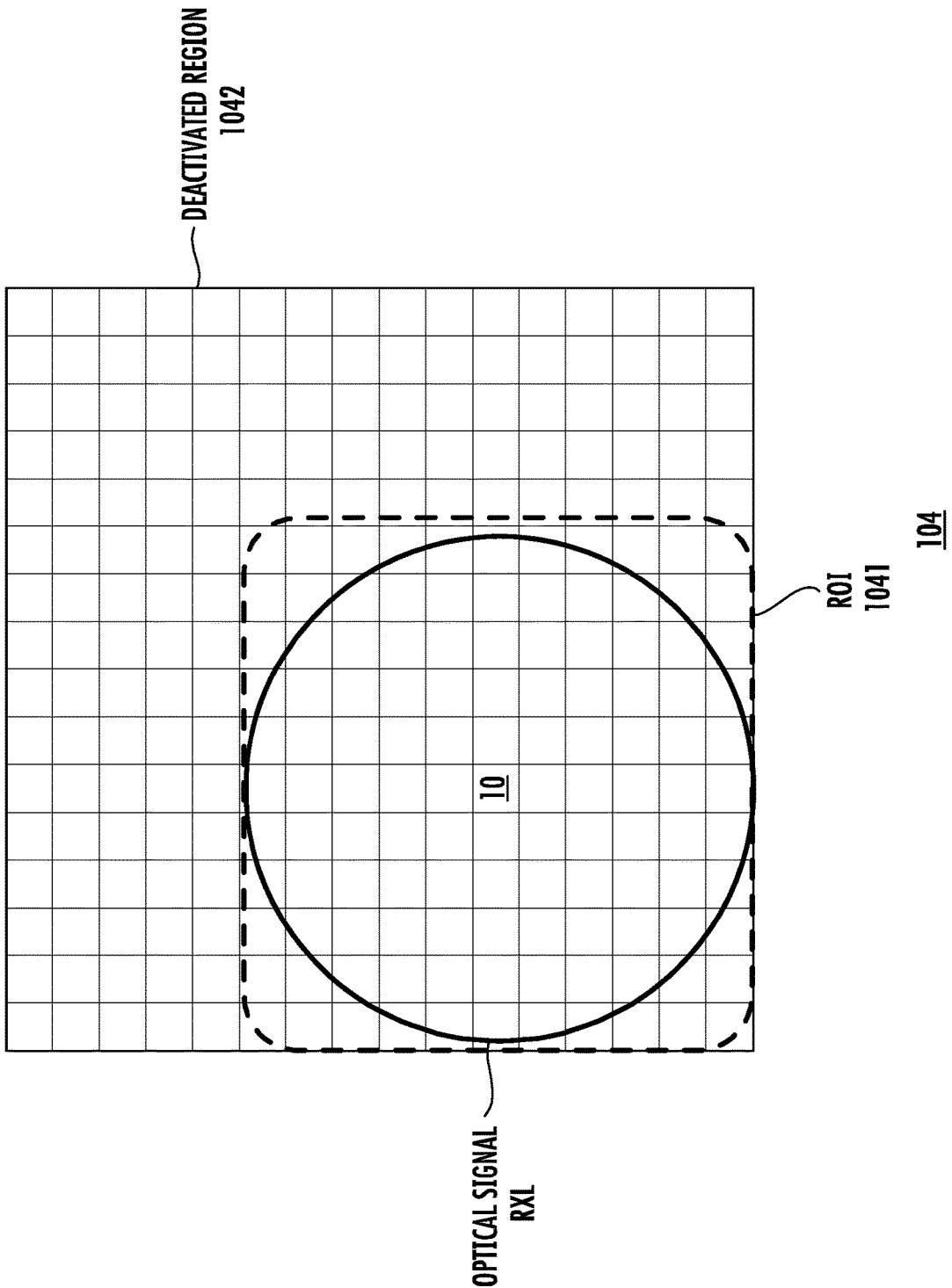
FIG. 1B depicts an example photodetector array according to example aspects of the present disclosure.

By way of example, FIG. 1B depicts an example of the photodetector array 104, where an ROI of the photodetector array 104 may be statically or dynamically configured based on an incident optical signal. For example, ROI 1041 and deactivated region 1042 can be configured, where ROI 1041 is configured to receive the optical signal RXL for performing optical measurements (e.g., depth measurement), and deactivated region 1042 is configured to be deactivated during operation. In other words, ROI 1041 includes a first subset of the plurality of photodetectors (e.g., less than the entire photodetector array) being enabled to receive the optical signal RXL during operation. Based on the ROI 1041, deactivated region 1042 can be configured, which includes a second subset of the plurality of photodetectors being deactivated during operation to save power. Such ROI configuration/reconfiguration is useful where misalignment may occur between the photodetector array 104 and one or more other components (e.g., a focusing lens) in a packaged sensor.

In some embodiments, determining the ROI 1041 in the photodetector array 104 can include determining, based on the one or more electrical signals, a ROI-center photodetector 10 of the first subset of the plurality of photodetectors representing a center of the ROI 1041. For example, in some implementations, the circuitry 110 is configured to determine a ROI-center photodetector 10 of the first subset of the plurality of photodetectors (e.g., ROI 1041) representing a center of the ROI 1041 based on the one or more electrical signals generated from the photodetector array 104. Furthermore, the ROI-center photodetector 10 can be determined by the circuitry 110 based on the distribution of electrical signal strengths (e.g., Gaussian) across the first subset of plurality of photodetectors generated in response to receiving the optical signal RXL.

In some embodiments, determining the ROI 1041 in the photodetector array 104 further includes determining, based on the one or more electrical signals, a size of the ROI 1041 in the photodetector array 104. For example, in some implementations, the circuitry 110 is configured to determine a size of the ROI 1041 based on the one or more electrical signals generated from the photodetector array 104. Furthermore, the size of the ROI 1041 can be determined by the circuitry 110 based on the distribution of electrical signal strengths across the first subset of plurality of photodetectors generated in response to receiving the optical signal RXL.

In some embodiments, determining the ROI 1041 in the photodetector array 104 can include dynamically changing the ROI 1041 in response to an optical signal received by the photodetector array. For example, in some implementations, the circuitry 110 is configured to dynamically change the ROI 1041 in response to the optical signal RXL received by the photodetector array 104 (e.g., during operation of the sensor). In some other embodiments, the circuitry 110 is configured to statically change the ROI 1041 in response to the optical signal RXL received by the photodetector array 104 (e.g., during calibration of the sensor).

In some embodiments, each photodetector of the photodetector array 104 includes a light-absorption material including germanium, where the light-absorption material is formed on a silicon substrate. For instance, the photodetector array 104 can include a pixel array comprising a plurality of pixels. The pixel array can include germanium, where the light-absorption material is formed on a silicon substrate.

Figure 5:
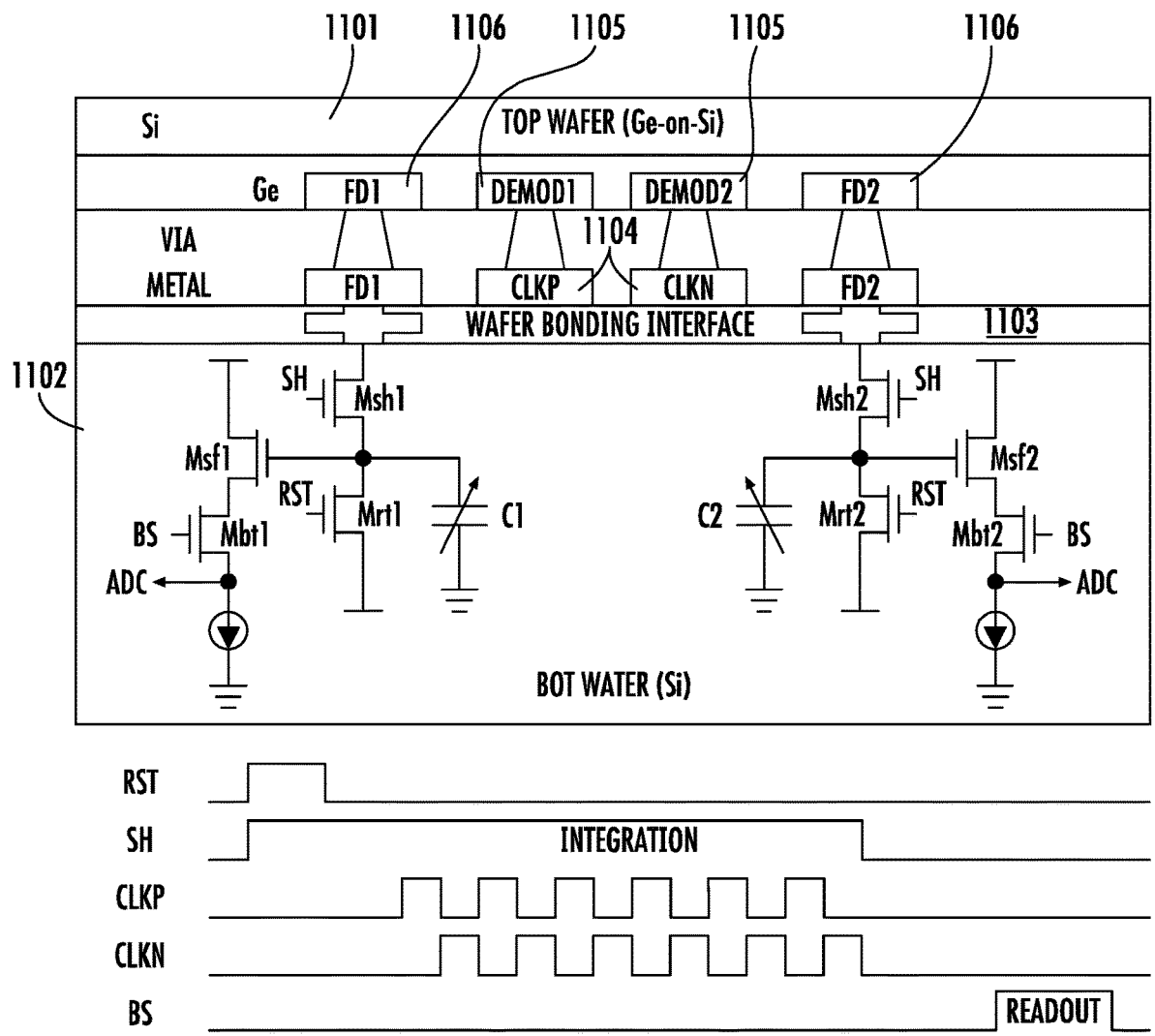
FIG. 5 depicts a cross-section view of a portion of an example photodetector according to example aspects of the present disclosure.

By way of example, a pixel array can be implemented in a Germanium-on-Silicon (Ge-on-Si) platform. The Ge-on-Si platform can be used to implement a variety of sensors and photodetectors including proximity sensors, image sensors, linear photodetectors, direct/indirect time-of-flight sensors, avalanche photodetectors, etc. For example, FIG. 5 shows an example pixel array cross-section (and clock signals suitable for use in a pixel array) of an i-ToF sensor implemented on a Ge-on-Si platform. The example pixel array depicted in FIG. 5 implements a Ge-on-Si architecture, which can allow for absorption of wavelengths in the near-infrared (NIR, e.g., wavelength range from 780 nm to 1400 nm, or any similar wavelength range as defined by a particular application) and short-wave infrared (SWIR, e.g., wavelength range from 1400 nm to 3000 nm, or any similar wavelength range as defined by a particular application) spectrum. This can allow for better signal-to-noise ratios (SNR) to be achieved while staying within maximum permissible exposure limits (MPE).

In some implementations, the i-ToF image sensor can be developed in a back-side illumination (BSI) configuration, in which the Ge region is formed on a first wafer 1101 (e.g., top wafer) and one or more circuits are located in a second wafer 1102 (e.g., bottom wafer). The first wafer 1101 and the second wafer 1102 can be bonded together through a wafer bonding interface 1103. In some embodiments, the pixels can follow a two-tap lock-in pixel architecture. One or more differential demodulation clocks 1104 (e.g., CLKP, CLKN) can be distributed on the first wafer 1101 so as, for example, to create a continuously switching lateral electric field at the Ge surface (e.g., the side closer to VIA) between first node(s) 1105 (e.g., Demod1, Demod2) in every pixel. Photocharges can be collected through second node(s) 1106 (e.g., FD1, FD2). In some embodiments, since most of the photocharges can be generated inside the Ge layer and the Ge layer can be thin, the lateral electric field at the Ge surface can effectively sweep the photo-charges to the second node(s) 1106. Moreover, the transit time for the photocharges drifting to one or more of the second node(s) 1106 (e.g., FD1 and/or FD2) can be short, again, due to the thin Ge layer, and therefore the demodulation speed can be significantly improved. In some embodiments, to minimize the coupling to any sensitive high-impedance node and relax the design rule requirement, the second node(s) 1106 (e.g., FD1 and/or FD2) can be interacted with the wafer bonding interface overlapping with the pixel area. The one or more differential demodulation clocks 1104 (e.g., CLKP and/or CLKN) can be routed to the second wafer 1102 clock drivers outside the pixel region. The pixel demodulation drivers can be realized with tapered inverter chains and the supply of the inverter chains can be adjusted to maximize performance. In some embodiments, the pixel circuits can be implemented as a differential 4-transistor architecture. A simplified timing diagram is also shown in the bottom of FIG. 5. Before every exposure, all pixels can be reset through Msh1/Msh2 and Mrt1/Mrt2 controlled by signal RST. After optical exposure, integration, and demodulation, the collected photo-charges can be stored on C1 and C2 controlled by signal SH. Finally, the readout to ADC can be accomplished through the source follower Msf1/Msf2 and the row-select switch Mbt1/Mbt2 controlled by signal BS. In some embodiments, 4-quad measurements can be implemented to recover the depth information without suffering from analog non-idealities.

Figure 2A:
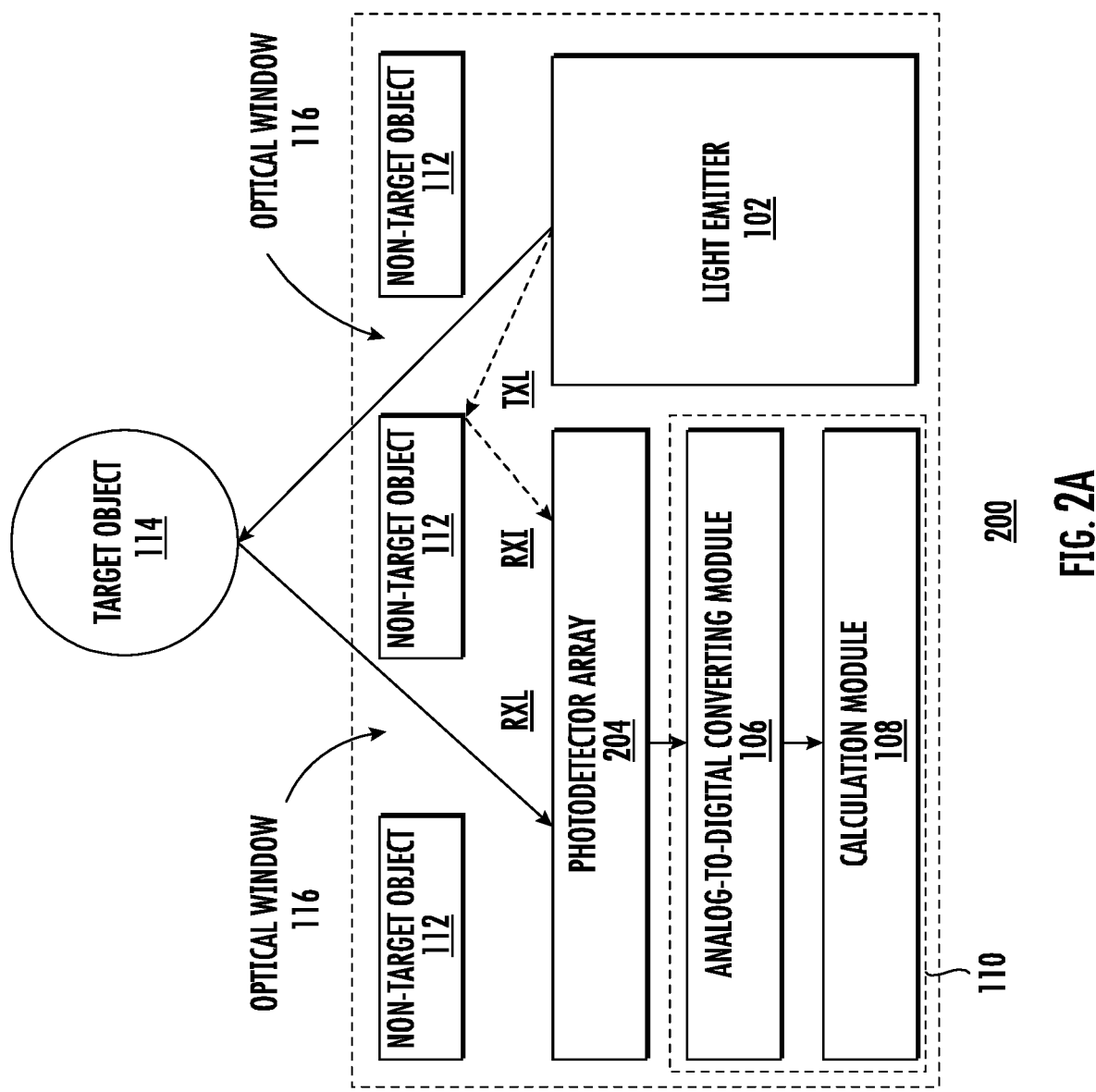
FIG. 2A depicts a block diagram of an example optical sensing apparatus according to example aspects of the present disclosure.

FIG. 2A depicts an example optical sensing apparatus 200. Compared with the optical sensing apparatus 100, a photodetector array 204 can be configured to identify multiple regions of interests. This embodiment considers a scenario that the optical signal TXL may be reflected not only by target object 114, but also the non-target object 112. By way of example, the non-target object 112 can be a case of the optical sensing apparatus 200 (e.g. the case of a mobile phone including an optical sensing apparatus). The case of the optical sensing apparatus 200 could be misaligned during a manufacturing process, overtime due to wear or use, etc. which may cause a portion of optical signal TXL being reflected by the case (e.g., interference optical signal RXI) and received by the photodetector array 204. Such interference optical signal RXI is generally undesirable, as it creates an interference with the reflected optical signal from the target object 114 (e.g., crosstalk, etc.). In order to have a correct measurement on the target object 114, the photodetector array 204 may have an additional ROI for receiving the interference optical signal RXI such that the calculation module 108 is able to perform the calculation based on the optical signal RXL and the interference optical signal RXI.

The optical sensing apparatus 200 can be configured to generate calibrated electrical signals based at least in part on the signals from multiple, different ROIs associated with signals from target and non-target objects. For example, as further described herein, the optical sensing apparatus 200 can include a photodetector array 204, which includes a first ROI (e.g., including one or more first photodetectors) configured to detect a first optical signal reflected from a target object 114 and output one or more first electrical signals, and a second ROI (e.g., including one or more second photodetectors) configured to detect a second optical signal reflected from a non-target object 112 and output one or more second electrical signals. There can also be included a deactivated region (e.g., including one or more third photodetectors) configured to be deactivated during operation. The optical sensing apparatus 200 can include circuitry 110 (or one or more processors) that can be configured to process the one or more first electrical signals and the one or more second electrical signals to generate one or more calibrated electrical signals and output the one or more calibrated electrical signals. For instance, the optical sensing apparatus 200 can receive one or more interference electrical signals representing the interference optical signal received by the third subset of the plurality of photodetectors. The optical sensing apparatus 200 can determine one or more calibrated electrical signals based on the one or more electrical signals representing the optical signal received by a first subset of the plurality of photodetectors and the one or more interference electrical signals. The optical sensing apparatus 200 can provide the one more calibrated electrical signals for output.

Figure 2B:
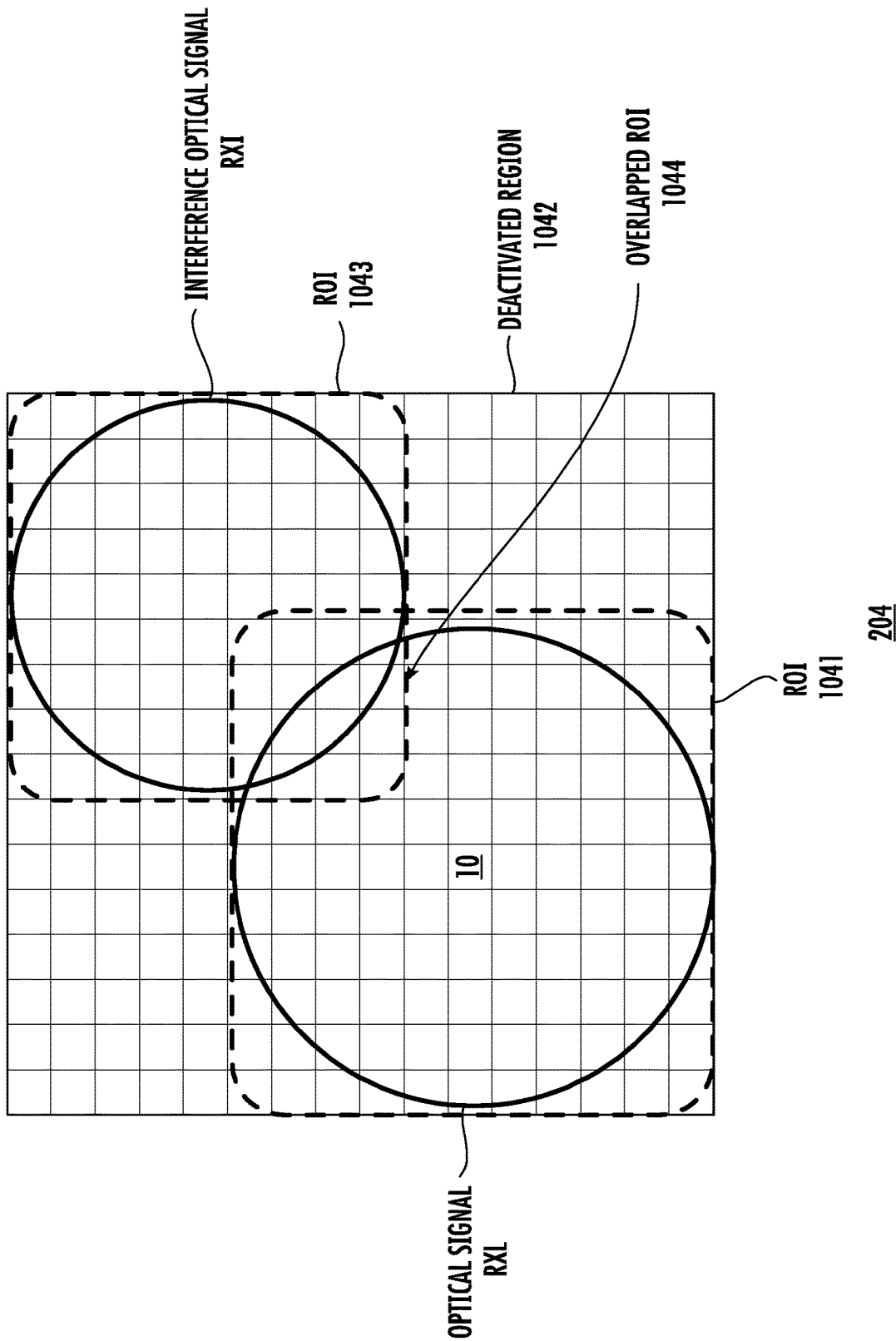
FIG. 2B depicts an example photodetector array according to example aspects of the present disclosure.

By way of example, FIG. 2B depicts exemplary embodiments of the photodetector array 204 according to a second configuration. The plurality of photodetectors can include a third subset of photodetectors representing a region for receiving an optical signal reflected from a non-target object. For instance, compared with the photodetector array 104, this embodiment further includes a ROI 1043 having a third subset of the plurality of photodetectors being enabled to receive the interference optical signal RXI during operation. As a projection area of the interference optical signal RXI and a projection area of the optical signal RXL could be close, the ROI 1041 and the ROI 1043 may be partially overlapped, as illustrated in FIG. 2B. In this example scenario, the first subset of photodetectors corresponding to the ROI 1041 and the third subset of photodetectors corresponding to the ROI 1043 include one or more common photodetectors representing an overlap between a portion of the ROI 1041 and a portion of the ROI 1043 (e.g., for receiving the interference optical signal). In other words, an overlapped ROI 1044 can be determined and used to receive the optical signal RXL and interference optical signal RXI during operation. In some other embodiments, the ROI 1041 and the ROI 1043 may be non-overlapped.

As the overlapped ROI 1044 will receive the optical signal RXL and interference optical signal RXI during operation, the interference optical signal RXI should be considered such that one or more calibrated electrical signals can be obtained by the calculation module 108.

In some embodiments, to obtain the one or more calibrated electrical signals, one exemplary process may be performed:

(1) emit the optical signal TXL without the target object 114,
(2) obtain the size of the ROI 1043 ("A_ROI2" in the equations (i) and (ii)) and an original intensity of the interference optical signal RXI in the ROI 1043 ("I_Xtalk" in the equations (i) and (ii)),
(3) emit the optical signal TXL with the target object 114,
(4) obtain the size of the ROI 1041 ("A_ROI1" in the equations (i) and (ii)) plus the ROI 1043 ("A_ROI2" in the equations (i) and (ii)),
(5) compare the size of the ROI 1041 with the size of a predefined ROI1 1041 to see if any difference therebetween, where the predefined ROI1 1041 is a region predefined during design stage for measuring the target object 114,
(6) obtain the size of the overlapped ROI 1044 ("A_ROIX" in the equation (i) and (ii)), based on the steps (2), (4) and (5),
(7) divide the overlapped ROI 1044 into two parts, assign half of the overlapped ROI 1044 to the ROI 1041 and assign half of the overlapped ROI 1044 to the ROI 1043,
(8) obtain the real intensity of the optical signal RXL ("I_ROI1" in the equation (i)) and real intensity of the interference optical signal RXI ("I_ROI2" in the equation (ii)), and
(9) calculate the original reflected signal ("I_ObjectReflected" in the equations (i) and (ii)) and the original interference signal ("I_Xtalk" in the equations (i) and (ii)) again by the calculation module 108, based on the equations (i) and (ii) below:

$$I_{ROI1} = \left(1 - \frac{\frac{A_{ROIX}}{2}}{A_{ROI_1}}\right) I_{ObjectReflected} + \left(\frac{\frac{A_{ROIX}}{2}}{A_{ROI_2}}\right) I_{Xtalk} \quad \text{Equation (i)}$$

$$I_{ROI2} = \left(1 - \frac{\frac{A_{ROIX}}{2}}{A_{ROI_2}}\right) I_{Xtalk} + \left(\frac{\frac{A_{ROIX}}{2}}{A_{ROI_1}}\right) I_{ObjectReflected} \quad \text{Equation (ii)}$$

In some embodiments, the equations (i) and (ii) can be implemented by a look-up table. One exemplary embodiment of step (9) can be implemented as below:

(A) derive a calibration table storing the relations between the real intensity of the optical signal RXL ("I_ROI1") and the original intensity of the optical signal RXL ("I_ObjectReflected"), and the relations between the real intensity of the interference optical signal RXI ("I_ROI2") and the original intensity of the interference optical signal RXI ("I_Xtalk"), and (B) determine, by the calculation module 108, one or more calibrated electrical signals based on the calibration table.

In some other embodiments, without using equations (i) and (ii), to obtain the one or more calibrated electrical signals, another exemplary process may be performed:

(1) emit the optical signal TXL without the target object 114,
(2) obtain the size of the ROI 1043 and an original intensity of the interference optical signal RXI in the ROI 1043,
(3) emit the optical signal TXL with the target object 114,
(4) obtain the size of the ROI 1041 plus the ROI 1043,
(5) compare the size of the ROI 1041 with the size of a predefined ROI' 1041 to see if any difference therebetween, where the predefined ROI1 1041 is a region predefined during design stage for measuring the target object 114,
(6) obtain the size of the overlapped ROI 1044, based on the steps (2), (4) and (5),
(7) obtain the real intensity of the optical signal RXL received at the partial ROI 1041 (without ROI 1044)
(8) build up a calibration table storing the relations between the real intensity of the optical signal RXL received at the partial ROI 1041 (without ROI 1044) and the original intensity of the optical signal RXL received at the entire ROI 1041, and
(9) determine, by the calculation module 108, one or more calibrated electrical signals based on the calibration table.

Figure 3A:
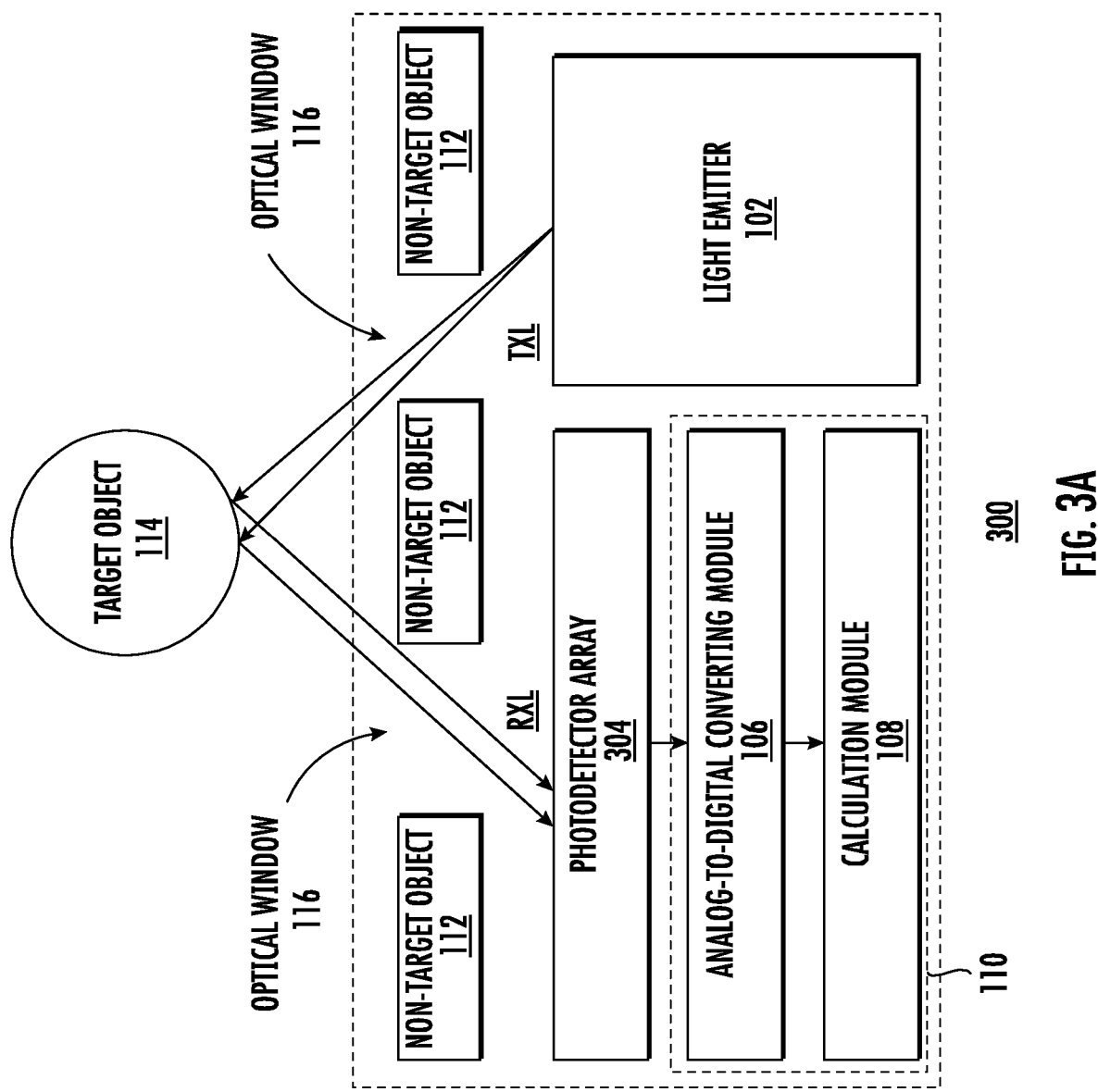
FIG. 3A depicts a block diagram of an example optical sensing apparatus according to example aspects of the present disclosure.

FIG. 3A illustrates exemplary embodiments of an optical sensing apparatus 300. Compared with the optical sensing apparatus 100 and the optical sensing apparatus 200, a photodetector array 304 can be configured with multiple ROIs for measuring the received optical signals having different wavelengths. This embodiment considers a scenario that the optical signal TXL may transmit a first optical signal TXL1 having a first wavelength (e.g., 940 nm) and a second optical signal TXL2 having a second wavelength (e.g., 1350 nm) such that the optical sensing apparatus 300 can perform wideband applications. For example, the optical sensing apparatus 300 may measure a material of the target object 114 or a behavior of the target object 114.

Figure 3B:
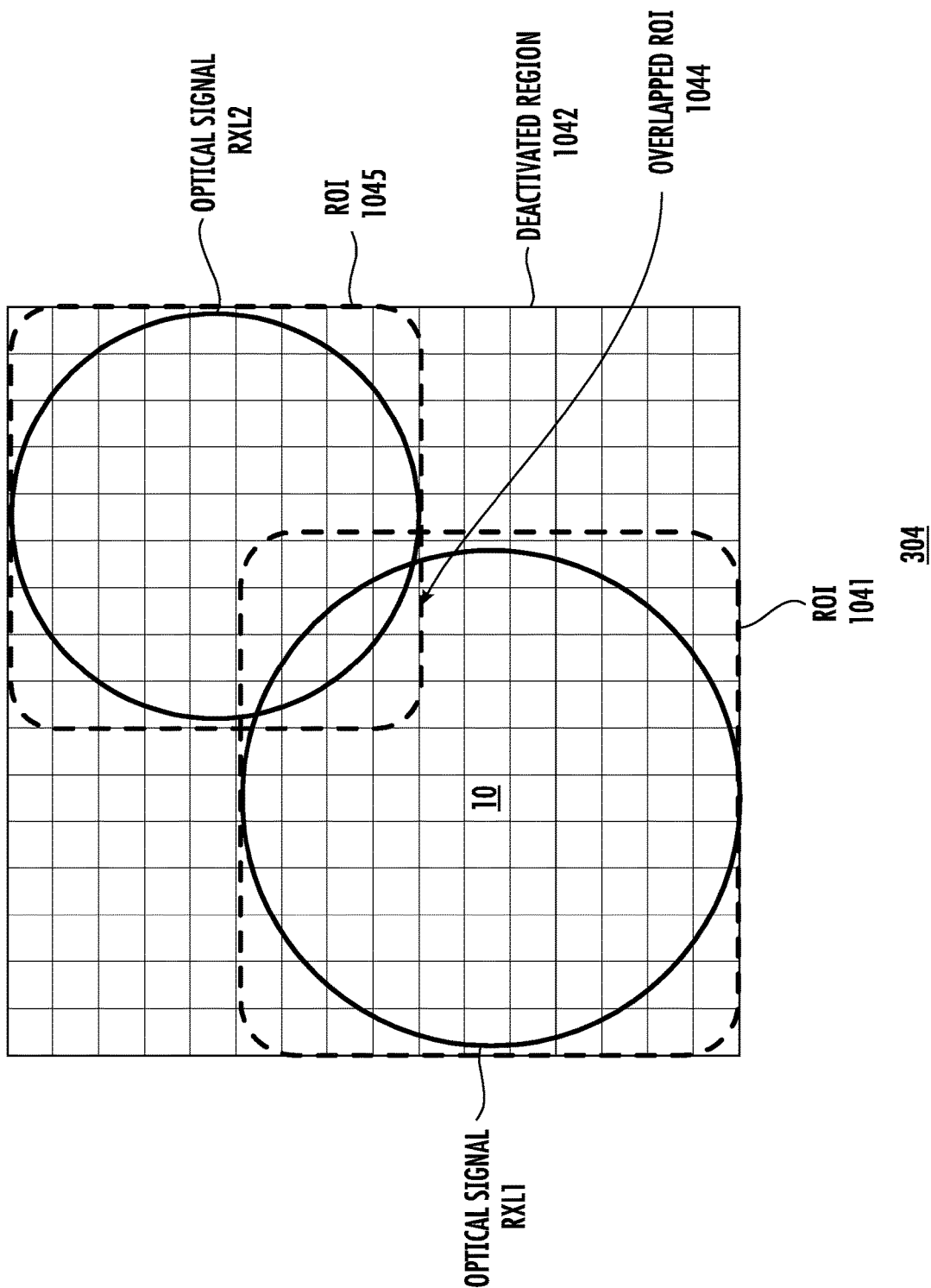
FIG. 3B depicts an example photodetector array according to example aspects of the present disclosure.

FIG. 3B illustrates exemplary embodiments of the photodetector array 304 according to a third configuration. Compared with the photodetector array 204, Both ROI 1041 and ROI 1045 are configured to measure wanted optical signals. ROI 1041 is configured to measure an optical signal RXL1 having the first wavelength (e.g., 940 nm) and the ROI 1045 is configured to measure an optical signal RXL2 having the second wavelength (e.g., 1350 nm). A location of a first ROI 1041 and a location of the second ROI 1045 can be determined during operation of the optical sensing apparatus. In some embodiments, the ROI 1041 and ROI 1045 may be non-overlapped, partially overlapped or entirely overlapped. With these ROI configurations on the photodetector array 304, the circuitry 110 can calculate the intensities of the optical signal RXL1 and optical signal RXL2 for performing wideband sensing applications.

Figure 4A:
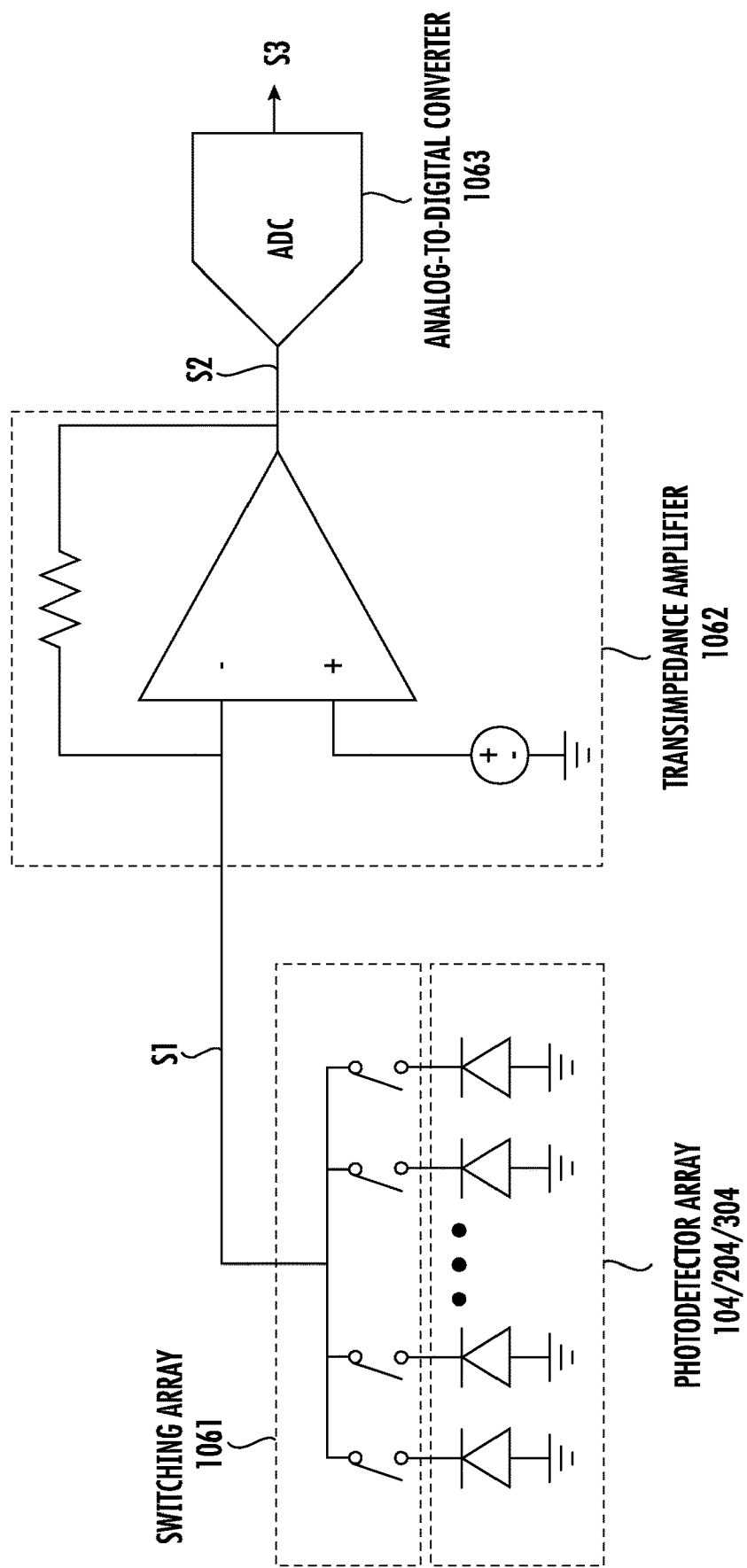
FIGS. 4A-4B depict an example analog-to-digital converting module according to example aspects of the present disclosure.

FIG. 4A illustrates an exemplary embodiment 406*a* of the analog-to-digital converting module 106. The analog-to-digital convertor module 106 can include an analog-to-digital converter 1063 coupled to the photodetector array 104/204/304.

For example, in some implementations, the analog-to-digital converting module 106 includes a switching array 1061, a transimpedance amplifier 1062, and an analog-to-digital converter 1063. The switching array 1061 can be configured to selectively couple to the one or more photodetectors formed on the photodetector array 104/204/304 and output one or more signals S1 (e.g., current) to the transimpedance amplifier 1062. In this example, the transimpedance amplifier 1062 is configured to convert the one or more signals S1 to one or more analog output signals S2 (e.g., voltage). The transimpedance amplifier 1062 can be coupled to the photodetector array 104/204/304 through the switching array. The analog-to-digital converter 1063 is configured to convert the one or more analog output signals S2 to digital output signals S3 (e.g., digitized voltage). Accordingly, the calculation module 108 can obtain the intensity of the optical signal for those photodetectors selected by the switching array 1061.

In some implementations, more than one electrical signal can be output by the switching array 1061. For example, one or more first electrical signals can include one or more first optical currents and one or more second electrical signals can include one or more second optical currents. The switching array 1061 can include one or more first switches, coupled to one or more first photodetectors (e.g., of the photodetector array 104/204/304). The first switches can be configured to selectively output one or more of the one or more first optical currents to the transimpedance amplifier 1062. The switching array 1061 can include one or more second switches, coupled to the one or more second photodetectors (e.g., of the photodetector array 104/204/304). The second switches can be configured to selectively output one or more of the one or more second optical currents to the transimpedance amplifier 1062. The switches can also be utilized to activate/de-active individual photodetectors (e.g., pixels)

Analog-to-digital convertor circuitry can be configured to convert one or more first optical currents to one or more first digital output signals and convert one or more second optical currents to one or more second digital output signals. For example, the analog-to-digital converter circuitry can include a transimpedance amplifier 1062 coupled to the photodetector array 104/204/134 and the transimpedance amplifier 1062 can be configured to convert the first one or more optical currents to one or more first analog output signals and convert the one or more second optical currents to one or more second analog output signals. The analog-to-digital converter circuitry can include an analog-to-digital converter 1063 coupled to the transimpedance amplifier 1062 and the analog-to-digital converter 1063 can be configured to convert the one or more first analog output signals to the one or more first digital output signals and convert the one or more second analog output signals to the one or more second digital output signals. In some implementations, a calculation module can be coupled to the analog-to-digital converter circuitry and the calculation module can be configured to determine one or more calibrated electrical signals based on the one or more first digital output signals and the one or more second digital output signals.

In some implementations, different optical currents can be converted at different times. For example, the analog-to-digital converter circuitry can convert the one or more first optical currents at a first time period (t1) and can convert the one or more second optical currents at a second time period (t2).

In connection with the optical sensing apparatus 100, the switching array 1061 can be configured to select the first subset of photodetectors of the photodetector array 104 as the ROI 1041 to receive the optical signal RXL during operation. Those un-selected photodetectors, which correspond to the second subset of photodetectors of the photodetector array 104, can be deactivated during operation to save power.

In connection with the optical sensing apparatus 200, the switching array 1061 can be configured to select the first subset of photodetectors of the photodetector array 204 as the ROI 1041 to receive the optical signal RXL and select the third subset of photodetectors of the photodetector array 204 as the ROI 1043 to receive the interference optical signal RXI during operation. Those un-selected photodetectors, the second subset of photodetectors of the photodetector array 204, can be deactivated during operation to save power.

In connection with the optical sensing apparatus 300, the switching array 1061 can be configured to select the first subset of photodetectors of the photodetector array 304 as the ROI 1041 to receive the optical signal RXL1 having the first wavelength (e.g., 940 nm) and select the third subset of photodetectors of the photodetector array 304 as the ROI 1045 to receive the optical signal RXL2 during operation. Those un-selected photodetectors, the second subset of photodetectors of the photodetector array 304, can be deactivated during operation to save power.

Although FIG. 4A depicts one transimpedance amplifier 1062 and one analog-to-digital converter 1063 as an example, in some other embodiments, analog-to-digital converting module 406a may include multiple transimpedance amplifiers 1062 and multiple analog-to-digital converters 1063. For example, one of the transimpedance amplifiers 1062 and one of the analog-to-digital converters 1063 are configured to convert the optical signal generated by the first subset of photodetectors of the ROI 1041, and the other one of the transimpedance amplifiers 1062 and the other one of the analog-to-digital converters 1063 are configured to convert the optical signal generated by the third subset of photodetectors of the ROI 1043. With multiple transimpedance amplifiers 1062 and multiple analog-to-digital converters 1063, the calculation module can perform the calculations on the intensity of the optical signal RXL and the intensity of the interference optical signal RXI at the same time.

In some embodiments, the ROI 1041, ROI 1043, ROI 1045 and the deactivated region 1042 can be configured offline (e.g., before product shipment) or online (e.g., during operation).

Figure 4B:
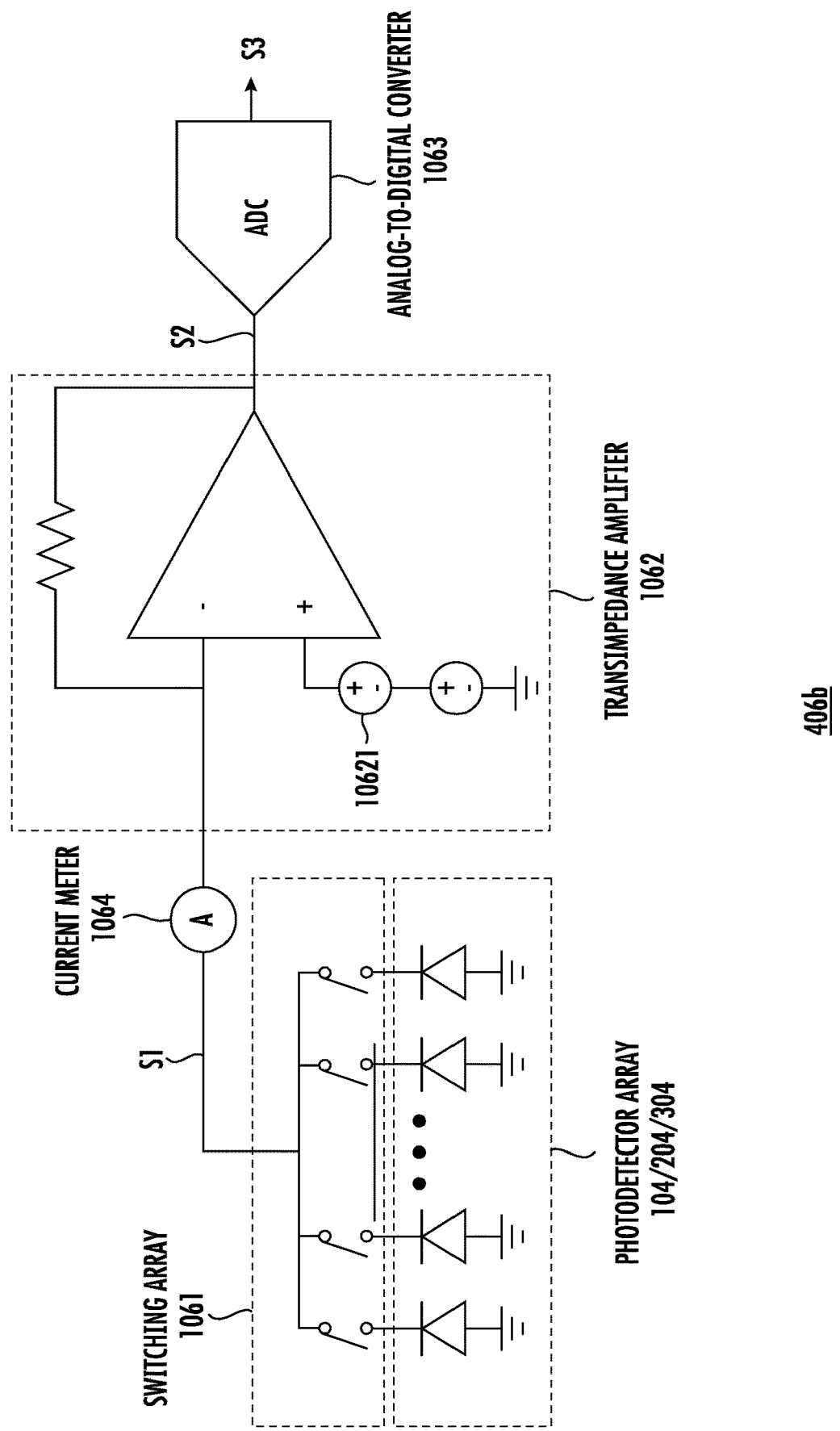

FIG. 4B illustrates another embodiment 406b of the analog-to-digital converting module 106. Compared with the analog-to-digital converting module 406a, the analog-to-digital converting module 406b further includes a current meter 1064 coupled between the transimpedance amplifier 1062 and the switching array 1061, configured to measure the one or more signals (e.g., currents) generated from the switching array 1061. This can include, for example, being configured to measure one or more first optical currents and the one or more second optical currents. In some embodiments, a controller or other circuitry may use the measured one or more signals as a reference to decide whether the ROI (e.g., ROI 1041, ROI 1043 or ROI 1045) need to be reconfigured (e.g., size, shape, location or ROI-center photodetector) during operation.

In some embodiments, the transimpedance amplifier 1062 may include a voltage compensator 10621 configured to compensate an equivalent voltage, where equivalent voltage is substantially equal to a voltage across of the current meter 1064, such that the one or more analog output signal S2 generated by the transimpedance amplifier 1062 will be more accurate.

The present disclosure provides some embodiments of reconfigurable optical sensing apparatuses and methods, including one or more ROIs to receive wanted or unwanted optical signals for performing optical measurements. The size, location and/or partition of these ROIs are configurable to have the measurements more accurate and can be used in many novel applications. Moreover, the photodetectors in each ROI may include a light-absorption material (e.g., germanium or III-IV material) formed on a silicon substrate to absorb the optical signal having longer wavelength (e.g., the wavelength is longer than 1000 nm). This can include, for example, the example platform discussed with reference to FIG. 5.

Figure 6:
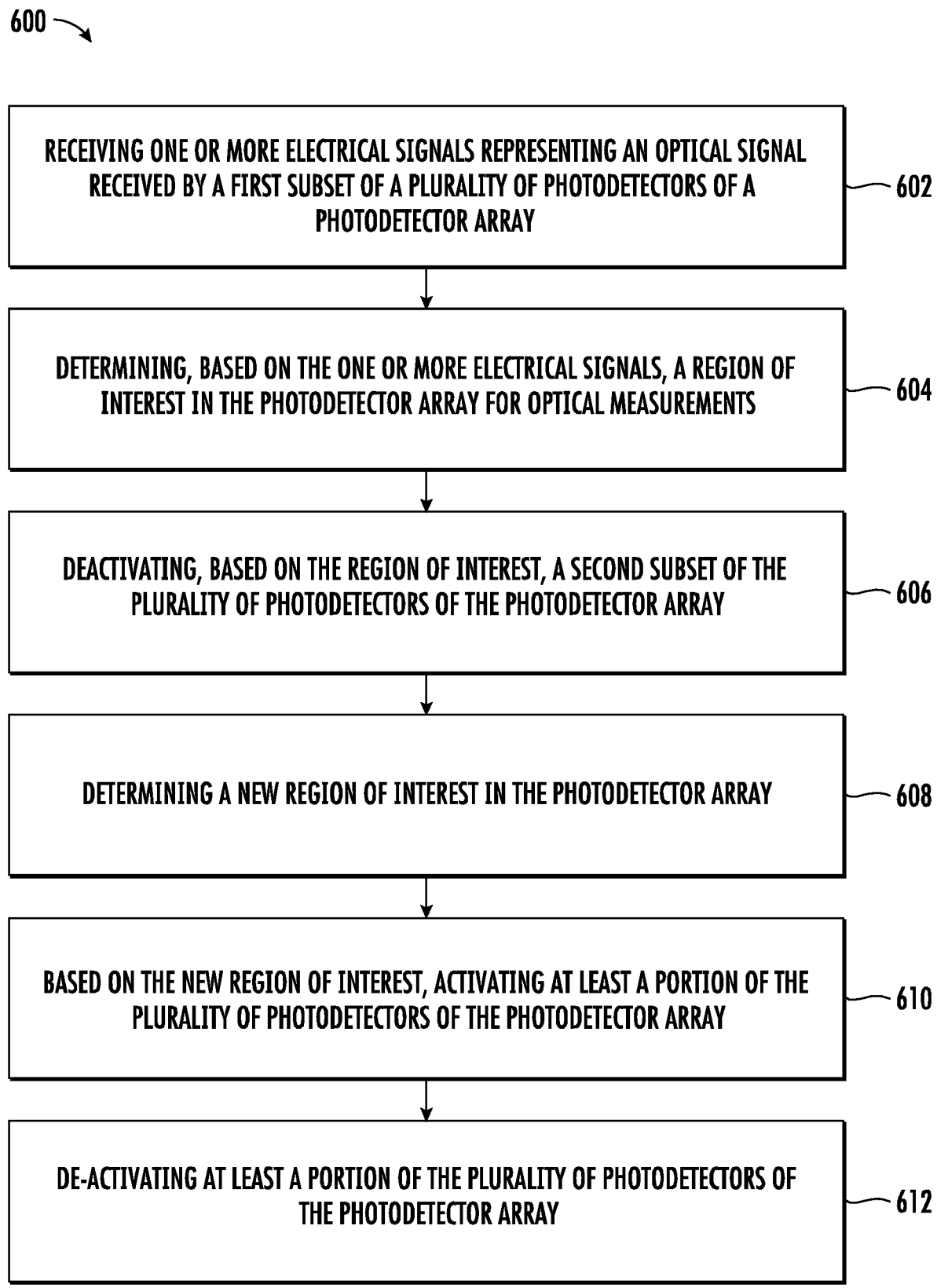
FIG. 6 a flow chart of an example process according to example aspects of the present disclosure.

FIG. 6 depicts a flowchart illustrating an example method 600 for optical sensing according to example embodiments of the present disclosure. One or more portions of the method 600 can be implemented by one or more devices such as, for example, any of those described herein (e.g., optical sensing apparatuses). One or more portions of the method 600 described herein can be implemented as an algorithm on the hardware components of the devices described herein (e.g., as in FIGS. 1-5 and 7) to, for example, customize a reconfigurable sensor. Although FIG. 6 depicts steps performed in a particular order for purposes of illustration and discussion, method 600 of FIG. 6 is not limited to the particularly illustrated order or arrangement. The various steps of the methods disclosed herein can be omitted, rearranged, combined, and/or adapted in various ways without deviating from the scope of the present disclosure.

At (602), the method 600 can include receiving one or more electrical signals representing an optical signal. For instance, an optical sensing apparatus can receive one or more electrical signals representing an optical signal received by a first subset of a plurality of photodetectors of a photodetector array. As described herein, the photodetector(s) can include pixel(s) of a pixel array. For each photodetector (e.g., pixel), the optical sensing apparatus can include a switch that controls a respective photodetector (e.g., switching from an activation state to a deactivation state, vice versa), as described herein.

At (604), the method 600 can include determining a region of interest. For instance, the optical sensing apparatus can determine, based on the one or more electrical signals, a region of interest (e.g., ROI 1041 in FIG. 2B) in the photodetector array for optical measurements. In some implementations, the optical sensing apparatus can determine the region of interest by determining, based on the one or more electrical signals, a ROI-center photodetector of the first subset of the plurality of photodetectors representing a center of the region of interest. This can be accomplished, for example, by determining the ROI-center photodetector based on a distribution of electrical signal strengths across the first subset of the plurality of photodetectors generated in response to receiving the optical signal.

In some implementations, the optical sensing apparatus can determine, based on the one or more electrical signals, a size and/or shape of the region of interest in the photodetector array. For example, the optical sensing apparatus can determine the size and/or shape of the region of interest based on a distribution of electrical signal strengths across the first subset of plurality of photodetectors generated in response to receiving the optical signal.

At (606), the method 600 can include deactivating, based on the region of interest, a second subset of the plurality of photodetectors of the photodetector array. For instance, the optical sensing apparatus can deactivate, based on the region of interest, a second subset of the plurality of photodetectors of the photodetector array (e.g., deactivated region 1042 in FIG. 2B). The second subset can include one or more photodetectors (e.g., pixels) that are within the photodetector array but outside of the region of interest. This can occur before, during, and/or after the first use of a device including the optical sensing apparatus. The photodetectors of the region of interest can be and/or remain activated.

In some implementations, the method 600 can include detecting optical signals with different portions of the photodetector array. For instance, the plurality of photodetectors of the optical sensing apparatus can include a third subset of photodetectors representing a region for receiving an interference optical signal. The interference optical signal can have a different wavelength than the optical signal received by the first subset of the plurality of photodetectors (of the region of interest), as described herein. Alternatively, the interference optical signal can represent an optical signal reflected from a non-target object (e.g., a surface of a module casing). The first subset of photodetectors and the third subset of photodetectors can include one or more common photodetectors representing an overlap between a portion of the region of interest and a portion of the region for receiving the interference optical signal.

In some implementations, the method 600 can include dynamically changing the region of interest in response to an optical signal received by the photodetector array. For instance, at (608), the method 600 can include determining a new region of interest. The optical sensing apparatus can receive one or more electrical signals representing an updated optical signal received by a fourth subset of a plurality of photodetectors of a photodetector array. The optical sensing apparatus can determine, based on the one or more electrical signals representing the updated optical signal, a new region of interest in the photodetector array for optical measurements. By way of example, optical sensing apparatus can be included within a mobile device of a user. A component (e.g., a case) of the mobile device may deform, shift, etc. over time and/or with use. As such, the optical sensing apparatus may receive electrical signals representing an updated optical signal received by a fourth subset of the plurality of photodetectors. In some implementations, the fourth subset of photodetectors may include one or more of the photodetectors in the first subset of photodetectors. Based on parameters of the previous region of interest associated with the first subset of photodetectors (e.g., size, shape, signal distribution, etc.), the optical sensing apparatus can interpolate and estimate the parameters of the new region of interest. For example, the optical sensing apparatus can determine that the new region of interest should approximately be the same size (e.g., a width/height of a certain number of pixels, etc.), shape (e.g., rectangular), etc. and shifted to the right (e.g., by a certain number of pixels, etc.) within the photodetector array.

Based on the new region of interest, the method 600 can include activating at least a portion of the plurality of photodetectors of the photodetector array, at (610), and/or deactivating at least a portion of the plurality of photodetectors of the photodetector array, at (612). For instance, the optical sensing apparatus can deactivate, based on the new region of interest, at least one photodetector of the photodetector array. This can include, for example, at least one photodetector that was included in the first subset of photodetectors. The new region of interest can include at least one of the photodetectors that were previously deactivated (e.g., outside of the region of interest associated with the first subset of photodetectors).

FIGS. 7-10 disclose a flexible circuitry integration architecture for an optical sensor. An optical sensor (e.g., the photodetector array 104 and the circuitry 110 in reference to FIG. 1A) typically operates along the following steps. A photo-detecting element having one or more light absorption regions (e.g., silicon, germanium, III-V materials, etc.) receives an optical signal, and generates a photo-current in response to the optical signal. An analog-front-end circuitry (e.g., a low-noise preamplifier) then converts the photo-current at the current domain to an analog signal at the voltage domain. A transimpedance amplifier (e.g., transimpedance amplifier 1062 in reference to FIG. 4A) circuitry then amplifies the analog signal at the voltage domain. An analog-to-digital converter (e.g., ADC 1063 in reference to FIG. 4A) circuitry then converts the amplified analog signal into a digital signal. The digital signal may be further processed by one or more processors (e.g., a microcontroller) and/or stored in a memory for the optical sensor's intended application(s).

When a photo-detecting element and the circuitry (e.g., CMOS circuitry) are designed by different entities (e.g., different companies), an integration between the photo-detecting element and circuitry may be challenging from a technical perspective. Using the analog-front-end circuitry (AFE circuitry) as an example, operations of the AFE circuitry are highly dependent on various properties of the photo-detecting element (e.g., dark current, operating bias, photo-responsivity, non-linearity, etc.). Therefore, the first entity that designs the photo-detecting element would generally be the most suitable entity to design the AFE circuitry. Moreover, the AFE circuitry converts electrical signals from the current domain to the voltage domain, which generally reduces the complexity of the designs of subsequent circuitry by the second entity. However, in many cases, the photo-detecting element is fabricated on a non-silicon material (e.g., III-V material) and therefore circuitry, which is typically fabricated on silicon, cannot be formed on the same material. To achieve better integration, the design of the AFE circuitry often becomes the responsibility of the second entity designing the rest of the circuitry. In that case, the circuit designer from the second entity, who may know little about the photo-detecting element designed by the first entity, would need to gather many parameters related to the properties of the photo-detecting element. The performance of the AFE circuitry may not be optimized, and the overall design time may be increased. Accordingly, there exists a need for a technical solution to integrate circuitry on different platforms for optical sensors. This disclosure describes a germanium-based optical sensor implemented on a germanium-on-silicon platform that can be further integrated with circuitry implemented on multiple silicon platforms. Such implementations provide several technical advantages including smaller form factor (e.g., vertical stacking), lower system costs, reliable wafer-level integration, and simplified circuit design (e.g., AFE circuitry designed and integrated with photodetectors, providing an output to subsequent circuitry at voltage domain, etc.).

Figure 7:
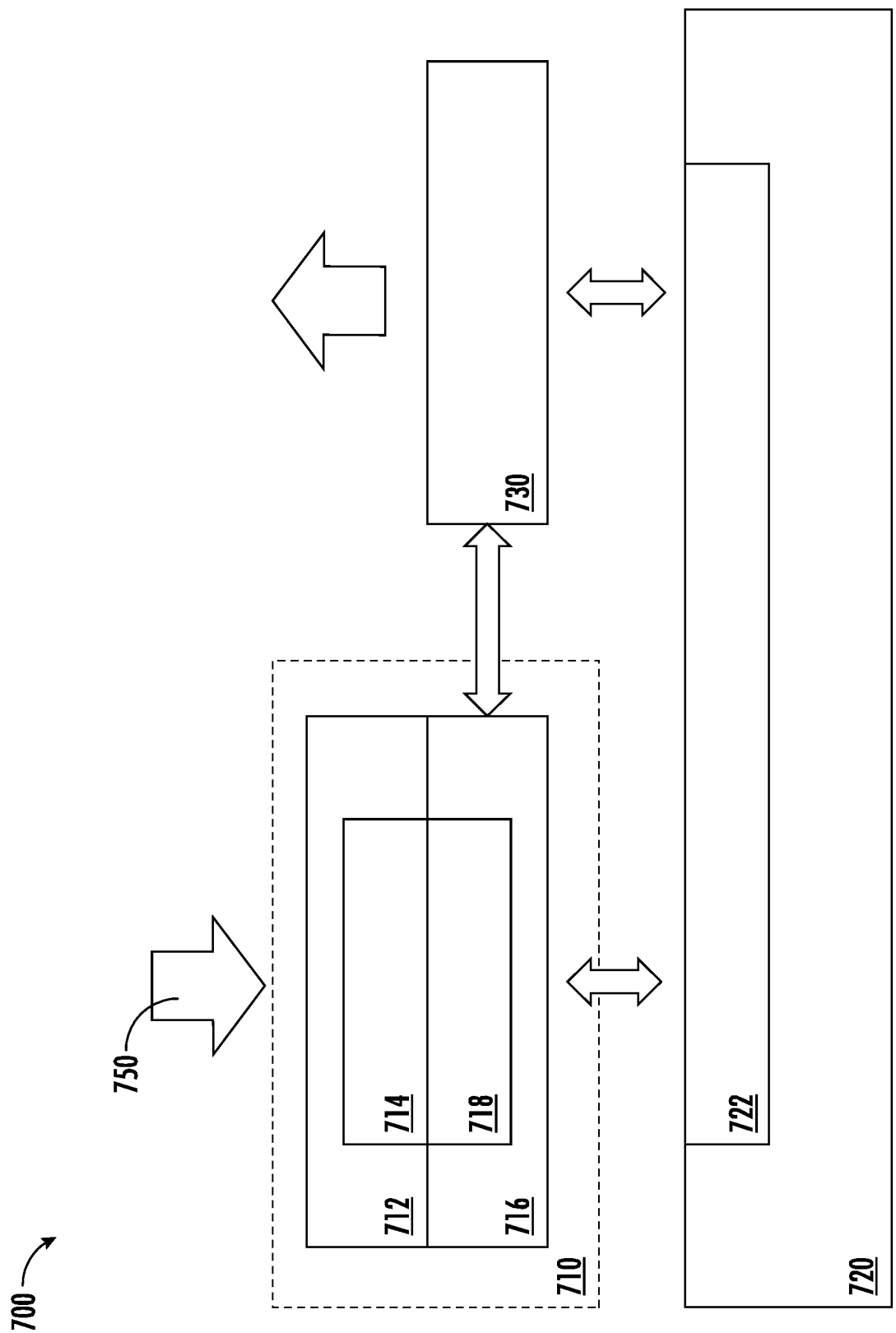
FIGS. 7-10 illustrate exemplary embodiments of an optical sensing apparatus, according to example aspects of the present disclosure.

FIG. 7 illustrates an example of an optical sensing apparatus 700. The optical sensing apparatus 700 includes a photodetector 710. The photodetector 710 includes a first substrate 712 formed using a first material (e.g., silicon), and an absorption region 714 formed on or at least partially in the first substrate 712. The absorption region 714 is formed using a second material (e.g., germanium), where the absorption region 714 is configured to receive an optical signal 750 and to generate a photo-current in response to receiving the optical signal 750. Using a germanium-onsilicon platform as an example, germanium-based materials (e.g., undoped/doped germanium, silicon-germanium compounds, etc.) may be deposited on a silicon-based substrate or in pattern-etched trenches in the silicon-based substrate using a CMOS-compatible fabrication process. The germanium-based materials may be used as one or more absorption regions for detection of NIR or SWIR light (e.g., the optical signal 750).

In some implementations, the absorption region 714 may include an array of pixels (e.g., photodetector array 104 as described in referenced to FIG. 1A). For example, a one-dimensional or a two-dimensional (e.g., 100 by 100 pixels, or any suitable numbers) germanium pixels (e.g., a pixel of dimensions 3 μm by 3 μm, or any suitable area) may be formed on/in a silicon substrate to form one large photodetector (e.g., a photodetector of dimensions 300 μm by 300 μm, or any suitable area). In some implementations, the array of pixels can be electrically coupled together to generate one photo-current. In some other implementations, each pixel of the array of pixels can be electrically coupled to its own circuitry for reading out the photo-current.

In some implementations, the photodetector 710 further includes a lens array (e.g., polymer or silicon lens as described in reference to FIG. 11A-11C) and/or one or more layers of anti-reflection coatings configured to focus the optical signal 750 to the array of pixels.

The photodetector 710 further includes a second substrate 716 bonded to the first substrate 712, where the second substrate 716 is formed using the first material (e.g., silicon). Using a germanium-on-silicon platform as an example, the first (silicon) substrate 712 may be bonded to the second (silicon) substrate 716 by wafer bonding.

Figure 8:
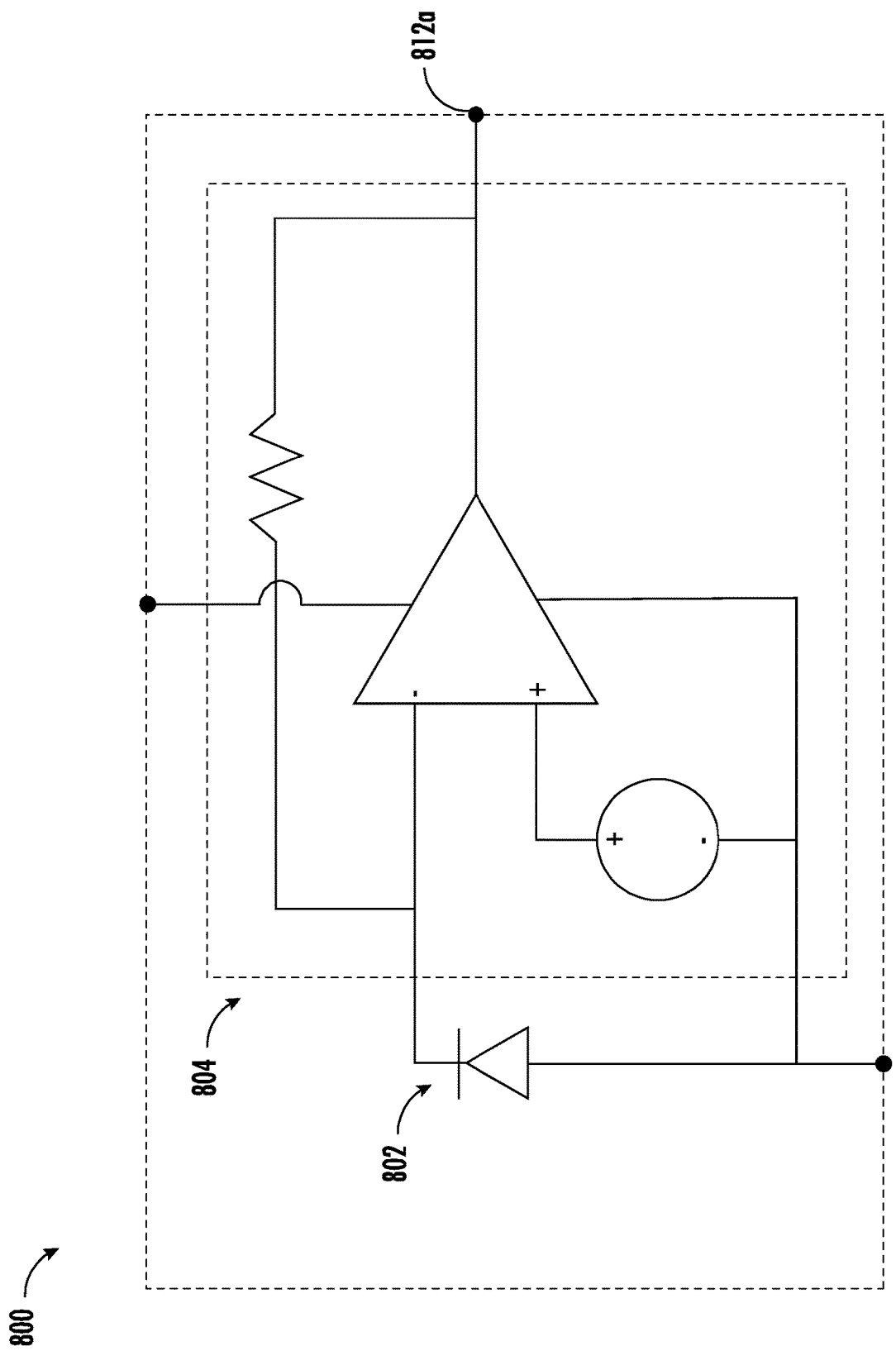

The photodetector 710 includes first circuitry 718 formed in the second substrate 716, where the first circuitry 718 is configured to convert the photo-current and to an analog voltage output for processing. For example, the first circuitry 718 may include an AFE circuitry fabricated using a CMOS process. Referring to FIG. 8 as an example, the circuitry 800 includes a photodiode 802, which can be a circuit-equivalent of a germanium-on-silicon platform (e.g., absorption region 714 formed in the first substrate 712) that provides a photocurrent in response to receiving an optical signal. The circuitry 800 further includes a low-noise preamplifier 804, which converts the photocurrent to an analog voltage output 812a.

The optical sensing apparatus 700 further includes a third substrate 720 coupled to the photodetector 710, where the third substrate 720 includes second circuitry 722 configured to process the analog voltage output to generate a digital output. For example, the second circuitry 722 may include an amplifier circuitry configured to amplify the voltage output, an analog-to-digital converter (e.g., analog-to-digital converting module 106 in FIG. 1A) configured to convert the amplified voltage output to a digital signal, and a micro-controller (e.g., calculation module 108 in FIG. 1A) configured to process the digital signal.

In some implementations, the first substrate 714 and the second substrate 716 may be bonded together by techniques such as flip-chip bonding. The first circuitry 718 and the second circuitry 722 may be electrically coupled using electrical vias and bond pads between the second substrate 716 and the third substrate 720. In some other implementations, the second substrate 716 and the third substrate 720 may be bonded together by wire-bonds.

In some implementations, any suitable portion of the second circuitry 722 may be instead implemented in the first circuitry 718. For example, if there is sufficient space on the second substrate 716, the amplifier circuitry, the ADC circuitry (e.g., analog-to-digital converting module 106 in FIG. 1A), and/or the MCU circuitry (e.g., calculation module 108 in FIG. 1A) can be implemented in the first circuitry 718. The second circuitry 722 can then be used to implement circuitry that is independent of the properties of the absorption region 714. Accordingly, the design of the first circuitry 718 and the second circuitry 722 can be flexible.

In some implementations, the optical sensing apparatus 700 further includes a light emitter 730 (e.g., light emitter 102 in FIG. 1A). The light emitter 730 may be electrically coupled to the first circuitry 718 or the second circuitry 722.

Figure 9:
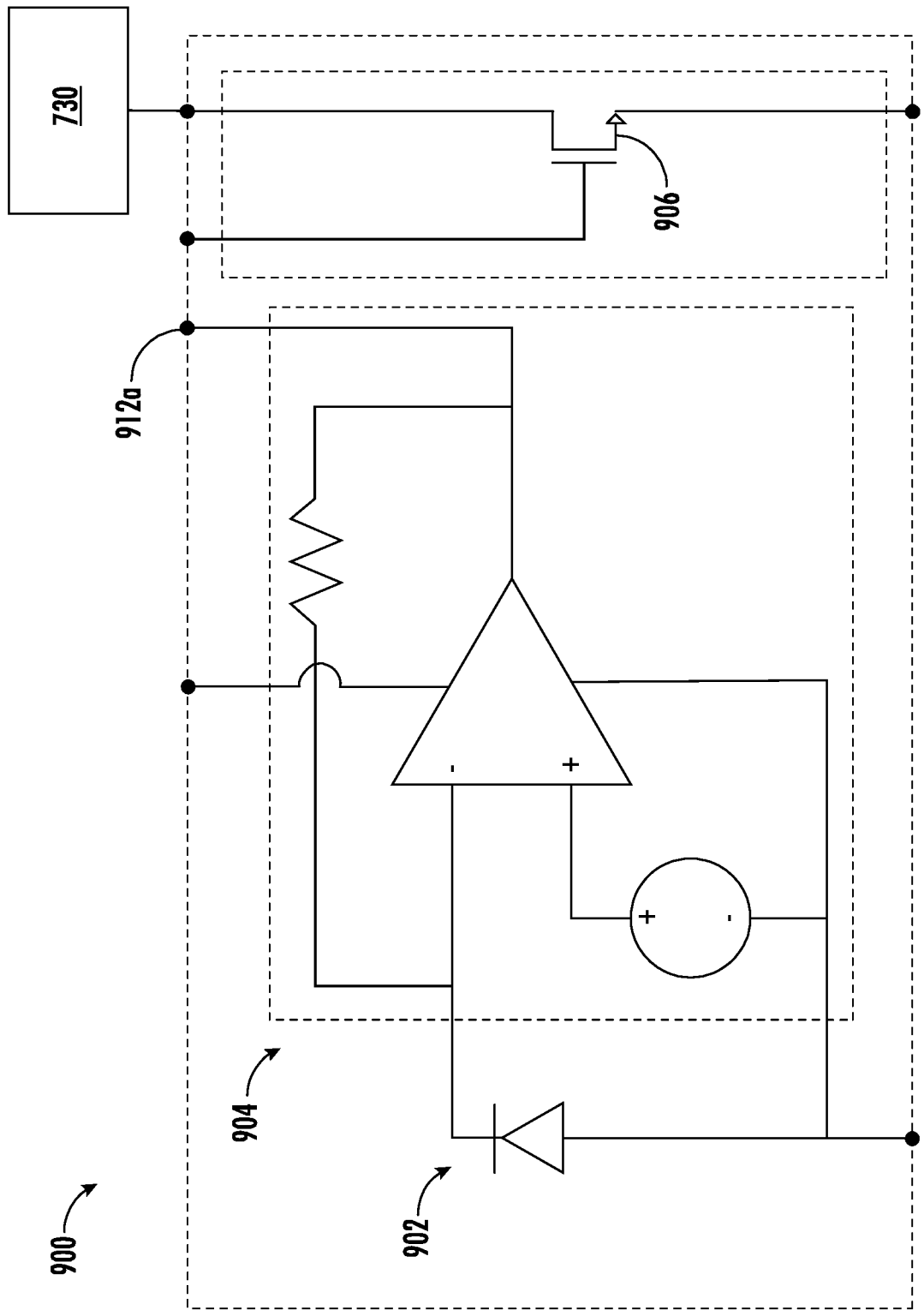

In some implementations, the first circuitry 718 further includes driver circuitry for the light emitter 730. Referring to FIG. 9 as an example, the circuitry 900 includes a photodiode 902 (e.g., photodiode 802 in FIG. 8), which can be a circuit-equivalent of a germanium-on-silicon platform (e.g., absorption region 714 formed in the first substrate 712) that provides a photocurrent in response to receiving an optical signal. The circuitry 900 further includes a low-noise preamplifier 904 (e.g., low-noise preamplifier 804 in FIG. 8), which converts the photocurrent to an analog voltage output 912a. The circuitry 900 further includes driver circuitry 906 configured to drive the light emitter 730. Accordingly, a laser driver may be implemented on the germanium-on-silicon platform to control a light emitter 730, where the second circuitry 722 may then be designed for application-specific circuitry instead of device-specific circuitry. This flexibility may enable the second circuitry 722 to be integrated with multiple types of light emitter and photodetectors with minor circuit modification.

Figure 10:
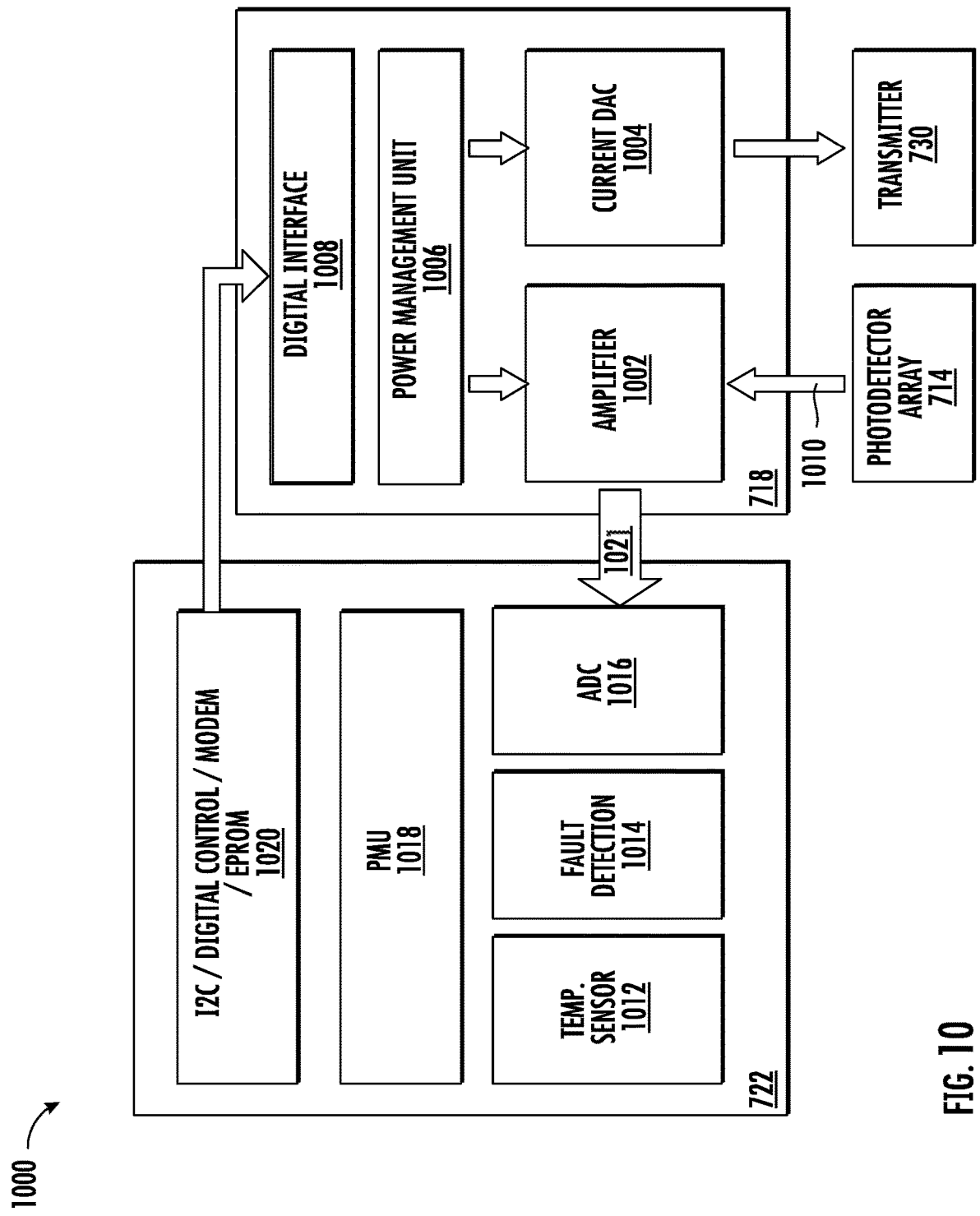

FIG. 10 shows a block diagram of an example optical apparatus 1000 that illustrates another non-limiting implementation of the first circuitry 718 and the second circuitry 722. The first circuitry 718 and the absorption region 714 are formed on two bonded substrates (e.g., first substrate 712 and second substrate 716), as described in reference to FIG. 7. In general, the first circuitry 718 can include optional customized circuitry blocks to fit different system and application requirements. In some implementations, the first circuitry 718 can include a programmable amplifier 1002 (e.g., the low-noise preamplifier 804 plus another programmable amplifier, etc.) that receives a current input 1010 from the absorption region 714 and outputs a corresponding analog voltage output 1021.

In some implementations, the first circuitry 718 can further include a current digital-to-analog converter (DAC) 1004 that receives a digital signal and converts the digital signal into an analog signal to drive the light emitter 730, which can be separate from or integrated on a common substrate as the absorption region 714 or the first circuitry 718. For example, both the absorption region 714 and the light emitter 730 may be fabricated based on germanium-on-silicon material on the first substrate 712. In some implementations, the first circuitry 718 and the absorption region 714 are integrated in one chip, where the absorption region 714 is composed of germanium for light absorption. In some implementations, the absorption region 714 includes one or more photodetectors composed of germanium for short wave infrared (SWIR) light absorption. In some implementations, the first circuitry 718 can further include a small power management unit (PMU) 1006 and a digital interface 1008 that receive signals from the second circuitry 722 for digital control.

In general, the second circuitry 722 can include any relevant circuitry (e.g., analog-to-digital converter (ADC) 1016, fault detection circuitry 1014, temperature sensor

1012, PMU 1018, I2C/Digital Control/MODEM/EPROM circuitry 1020, and/or any other relevant circuitry) that converts the analog voltage output 1021 to a digital signal and processes the converted digital signal for the intended application(s). In some implementations, the ADC 1016 may include a multiplexer (MUX) that can receive analog inputs from multiple sensors to implement multiple sensing functions.

Figure 11A:
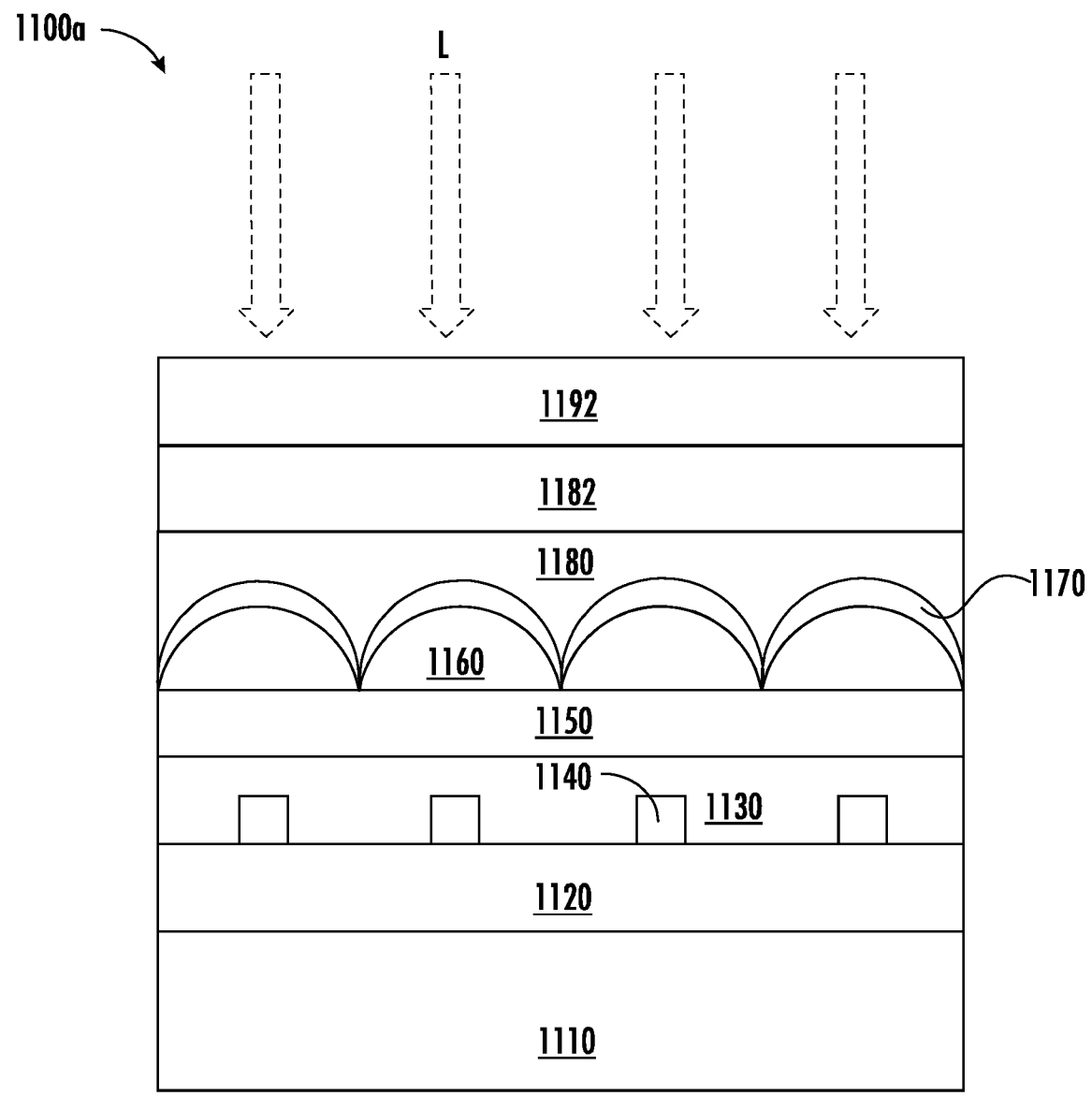
FIGS. 11A-11C illustrate cross-sectional views of an optical sensing apparatus with a micro-lens, according to example aspects of the present disclosure.
Figure 11B:
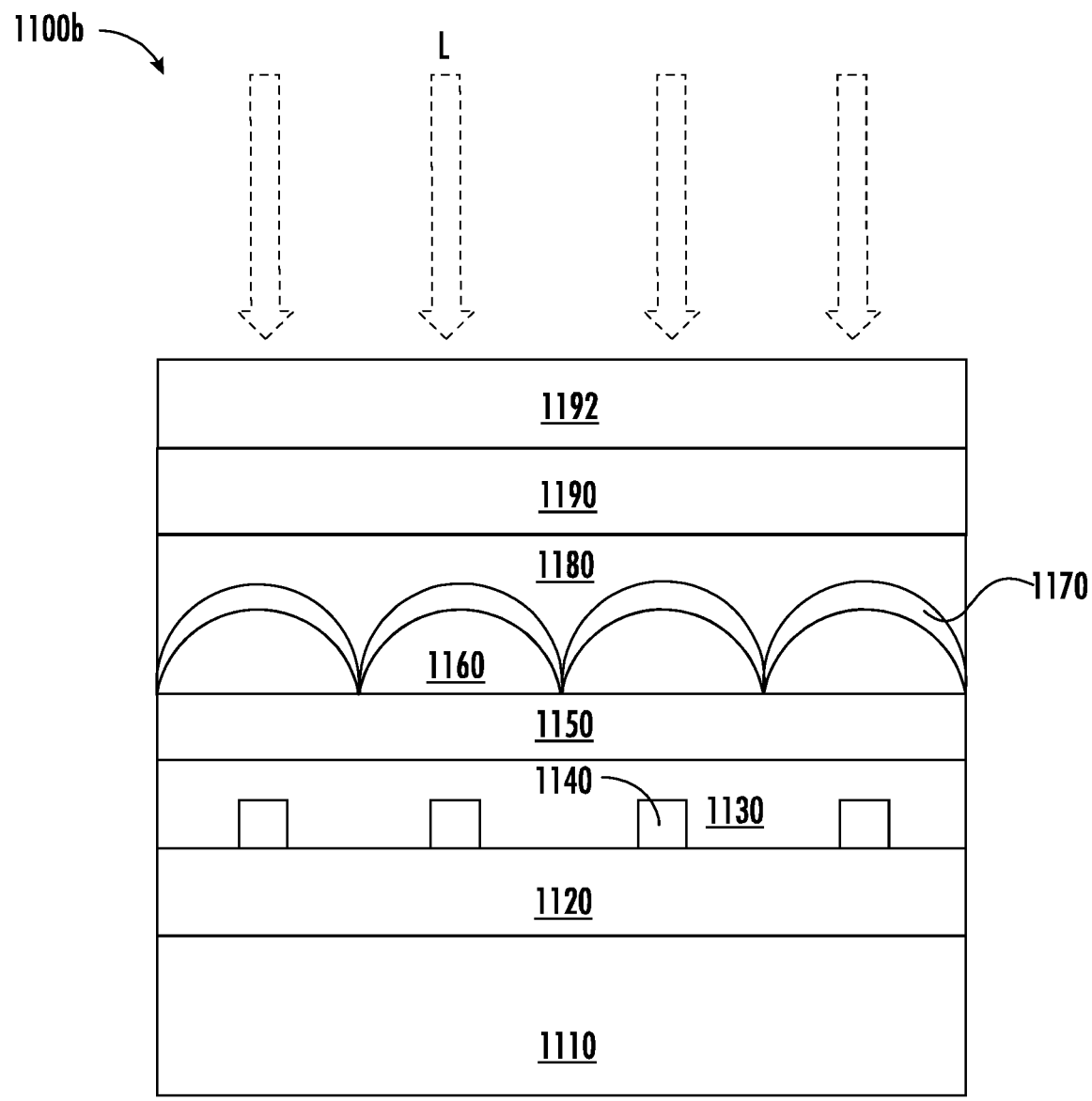
Figure 11C:
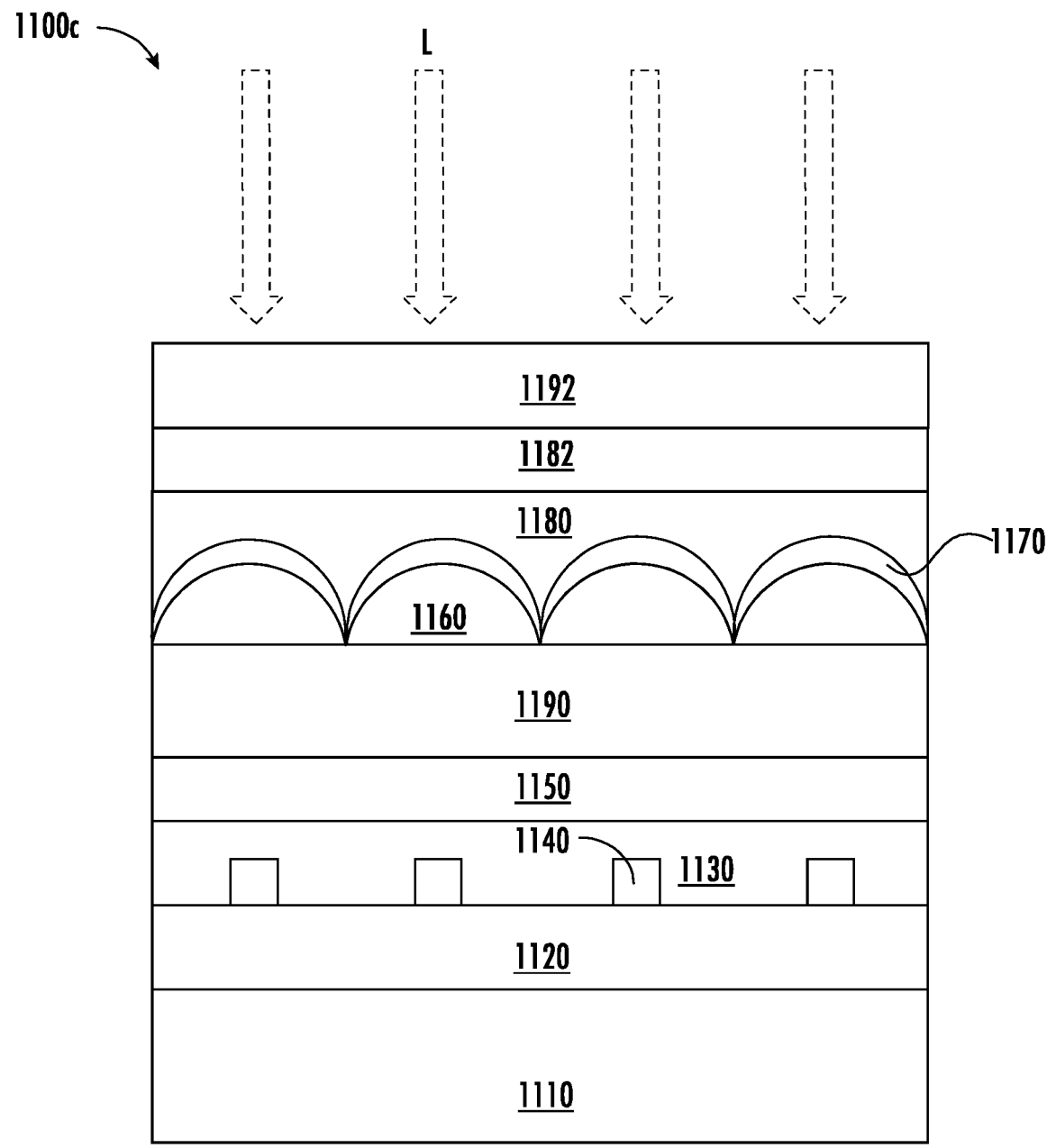

FIG. 11A-11C discloses examples of high-index microlens array assembly for photodetectors (e.g., a photodetector 710 in FIG. 7). During packaging or assembling an optical sensor component (e.g., chip or module) on a system (e.g., printed circuit board), an encapsulation layer such as epoxy may be used to cover the optical component in order to protect the optical component. The optical sensor component may include a micro-lens or a micro-lens array for guiding (e.g., focusing) light onto the sensor(s). The micro-lens may be formed using a polymer-based material, which may have an effective refractive index that is close to the effective refractive index of the encapsulation layer. As the result of the lower refractive index contrast, the designed performance (e.g., focal length) of the micro-lens may suffer. Accordingly, an optical sensing apparatus 1100 (e.g., 1100a, 1100b, 1100c) that addresses such technical issue is disclosed. The optical sensing apparatus 1100 includes a substrate 1130 (e.g., Si, or the first substrate 712 in FIG. 7); one or more pixels 1140 supported by the substrate, where each of the pixel 1140 comprises an absorption region (e.g., Ge, or the absorption region 714 in FIG. 7) supported by the substrate, the absorption region configured to receive an optical signal L and generate photo-carriers in response to receiving the optical signal.

The optical sensing apparatus 1100 further comprises one or more lenses 1160 over the respective pixel of the one or more pixels 1140, where the one or more lenses 1160 are composed of a first material (e.g., Si) having a first refractive index (e.g., >3 at the wavelength range absorbed by the absorption region of the one or more pixels 1140). The optical sensing apparatus 1100 further comprises an encapsulation layer 1192 over the one or more lenses and composed of a second material (e.g., polymer) having a second refractive index between 1.3 to 1.8, where a difference between the first refractive index and the second refractive index is above an index threshold such that a difference between an effective focal length of the one or more lenses 1160 and a distance between the one or more lenses 1160 and the one or more pixels 1140 is within a distance threshold (e.g., 1%, 5%, or any other threshold that is tolerable by the system). As a result, the optical signal L can be converged and focused to enter the absorption region of the one or more pixels 1140.

In some embodiments, the first refractive index of the one or more lenses 1160 is not less than 3, where the difference between the first refractive index and the second refractive index of the encapsulation layer 1192 is not less than 0.5, such that optical signal L can be converged and focused to enter the absorption region of the one or more pixels 1140.

In some embodiments, the optical sensing apparatus 1100 further comprises a first planarization layer 1180 between the encapsulation layer 1192 and the one or more lenses 1160, where the first planarization layer 1180 is composed of a third material (e.g., polymer or oxide material such as SixOy) having a third refractive index (e.g., between 1 and 2 at the wavelength range absorbed by the absorption region of the one or more pixels 1140) that is within a threshold (e.g., 1%, 5%, or any other threshold that is tolerable by the system) from the second refractive index so as to minimize reflection when the optical signal L passes through the interface between the encapsulation layer 1192 and the first planarization layer 1180. In some embodiments, the first planarization layer 1180 is configured to provide a substantially flat surface for the subsequent layer (e.g., encapsulation layer 1192, filter layer 1190 in FIG. 11B, second anti-reflection layer 1182 in FIG. 11A, or one or more lenses 1160) to be formed on.

In some embodiments, the first planarization layer 1180 or the second planarization layer 1150 is composed of a material comprising polymer having a refractive index between 1 and 2. In some embodiments, the optical sensing apparatus 1100 further comprises a second anti-reflection layer 1182 (e.g., FIGS. 1A and 1C) between the first planarization layer 1180 and the encapsulation layer 1192, where the second anti-reflection layer 1182 is composed of a sixth material (e.g., polymer or oxide material such as SixOy) having a sixth refractive index (between 1 and 2 at the wavelength range absorbed by the absorption region of the one or more pixels 1140) between the second refractive index of the encapsulation layer and the third refractive index of the first planarization layer. In some embodiments, the sixth material of the second anti-reflection layer 1182 and the third material of the first planarization layer 1180 can be the same. In some embodiments, the sixth refractive index is within a threshold (e.g., 1%, 5%, or any other threshold that is tolerable by the system) from the second refractive index so as to minimize reflection when the optical signal L passes through the interface between the encapsulation layer 1192 and the second anti-reflection layer 1182.

In some embodiments, the optical sensing apparatus 1100 further comprises a filter layer (e.g., 1190 in FIG. 11C) between the one or more lenses 1160 and the one or more pixels 1140, wherein the filter layer is configured to pass optical signal having a specific wavelength range.

In some embodiments, the optical sensing apparatus 1100 further comprises comprising a second planarization layer 1150 (e.g., in FIG. 11C) between the filter layer 1190 and the substrate 1130. In some embodiments, the optical sensing apparatus further comprises a carrier substrate 1110 (e.g., the second substrate 716 in FIG. 7) and an integrated circuit layer 1120 (e.g., the first circuitry 718 in FIG. 7) between the one or more pixels 1140 and the carrier substrate 1110, wherein the integrated circuit layer 1120 comprises a control circuit configured to control the one or more pixels 1140.

In some embodiments, the substrate 1130 is composed of a material comprising silicon. In some embodiments, the absorption region is composed of a material comprising germanium. In some embodiments, the absorption regions of the one or more pixels 1140 are at least partially embedded in a substrate 1130.

In the present disclosure, if not specifically mention, the absorption region has a thickness depending on the wavelength of photons to be detected and the material of the absorption region. In some embodiments, when the absorption region includes germanium and is designed to absorb photons having a wavelength equal to or greater than 800 nm, the absorption region has a thickness equal to or greater than 0.1 µm. In some embodiments, the absorption region includes germanium and is designed to absorb photons having a wavelength between 700 nm and 2000 nm, the absorption region has a thickness between 0.1 µm and 2.5 µm. In some embodiments, the absorption region has a thickness between 1 µm and 2.5 µm for higher quantum efficiency. In some embodiments, the absorption region may be grown using a blanket epitaxy, a selective epitaxy, or other applicable techniques.

As used herein and not otherwise defined, the terms "substantially" and "about" are used to describe and account for small variations. When used in conjunction with an event or circumstance, the terms can encompass instances in which the event or circumstance occurs precisely as well as instances in which the event or circumstance occurs to a close approximation. For example, when used in conjunction with a numerical value, the terms can encompass a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

Figure 12:
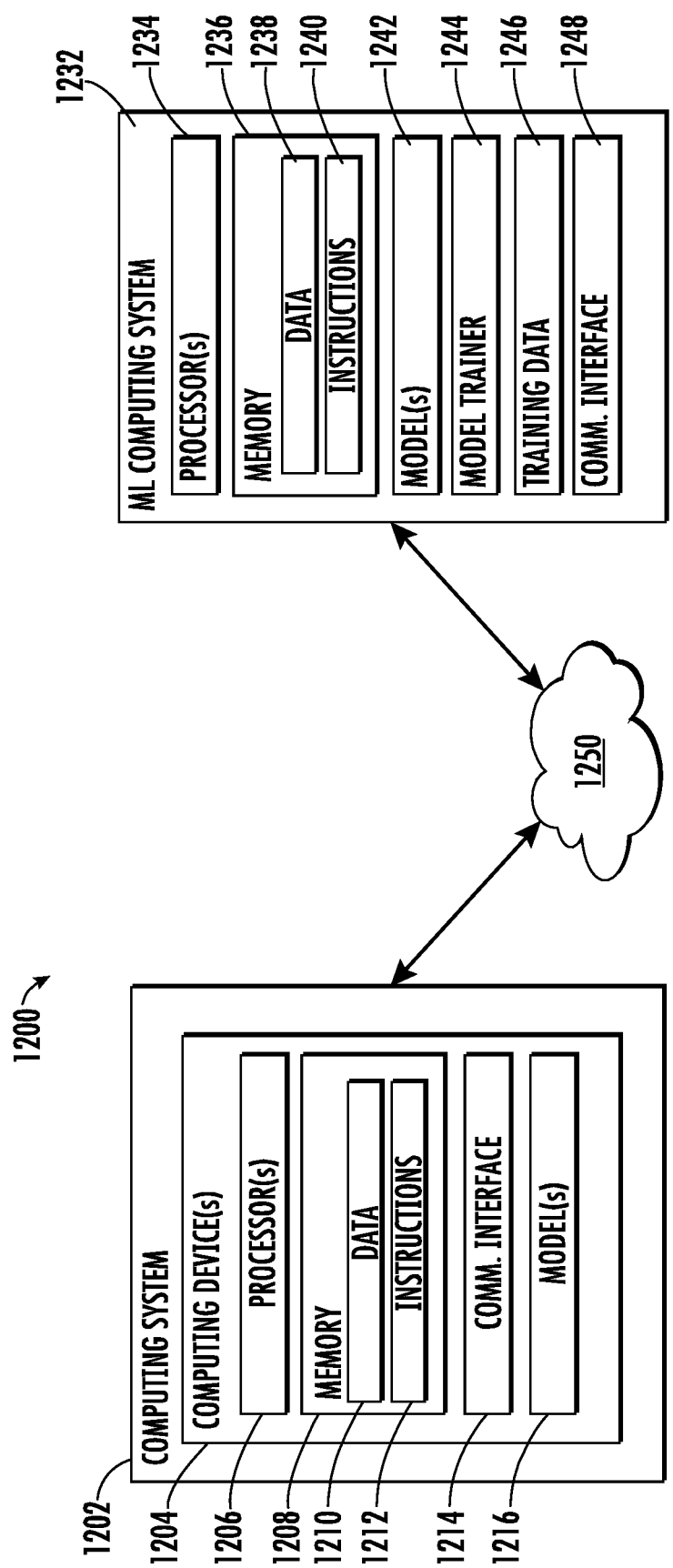
FIG. 12 depicts example computing system components and devices according to example aspects of the present disclosure.

FIG. 12 depicts a block diagram of an example computing system 1200 according to example embodiments of the present disclosure. The example computing system 1200 includes a computing system 1202 and a machine learning computing system 1232 that are communicatively coupled over a network 1250.

In some implementations, the computing system 1202 can perform the operations and functions of the various computing devices described herein. For example, the computing system 1202 can represent an optical sensing apparatus, the various components of an optical sensing apparatus, and/or other elements described herein and can perform the functions of such elements. The computing system 1202 can include one or more distinct physical computing devices.

The computing system 1202 can include one or more computing devices 1204. The one or more computing devices 1204 can include one or more processors 1206 and a memory 1208. The one or more processors 1206 can be any suitable processing device (e.g., a processor core, a microprocessor, an ASIC, a FPGA, a controller, a microcontroller, etc.) and can be one processor or a plurality of processors that are operatively connected. The memory 1208 can include one or more non-transitory computer-readable storage media, such as RAM, ROM, EEPROM, EPROM, one or more memory devices, flash memory devices, etc., and combinations thereof.

The memory 1208 can store information that can be accessed by the one or more processors 1206. For instance, the memory 1208 (e.g., one or more non-transitory computer-readable storage mediums, memory devices) can store data 1210 that can be obtained, received, accessed, written, manipulated, created, and/or stored. The data 1210 can include, for instance, data indicative of: one or more electrical signals, optical currents, interference signals, targets, non-targets, regions of interest, photodetectors, calibrated signals, inputs/output, and/or any other data and/or information as described herein. In some implementations, the computing system 1202 can obtain data from one or more memory device(s) that are remote from the computing system 1202.

The memory 1208 can also store computer-readable instructions 1212 that can be executed by the one or more processors 1206. The instructions 1212 can be software written in any suitable programming language or can be implemented in hardware. Additionally, or alternatively, the instructions 1212 can be executed in logically and/or virtually separate threads on processor(s) 1206.

For example, the memory 1208 can store instructions 1212 that when executed by the one or more processors 1206 cause the one or more processors 1206 to perform any of the operations and/or functions described herein, including, for example, the operations and functions of any of the systems/apparatuses described herein, one or more portions of the methods/processes described herein, and/or any other functions or operations.

According to an aspect of the present disclosure, the computing system 1202 can store or include one or more machine-learned models 1216. As examples, the machine-learned models 1216 can be or can otherwise include various machine-learned models such as, for example, neural networks (e.g., deep neural networks), support vector machines, decision trees, ensemble models, k-nearest neighbors models, Bayesian networks, or other types of models including linear models and/or non-linear models. Example neural networks include feed-forward neural networks, recurrent neural networks (e.g., long short-term memory recurrent neural networks), convolutional neural networks, or other forms of neural networks.

In some implementations, the computing system 1202 can receive the one or more machine-learned models 1216 from the machine learning computing system 1232 over network 1250 and can store the one or more machine-learned models 1216 in the memory 1208. The computing system 1202 can then use or otherwise implement the one or more machine-learned models 1216 (e.g., by processor(s) 1206). In particular, the computing system 1202 can implement the machine learned model(s) 1216 for a proximity sensing application, a gesture recognition application, a three-dimensional imaging application, statically or dynamically determining regions of interests, or any other suitable sensing applications. In some implementations, the input to the machine learned model(s) 1216 can be a fused input based on signals from multiple sources.

The machine learning computing system 1232 includes one or more processors 1234 and a memory 1236. The one or more processors 1234 can be any suitable processing device (e.g., a processor core, a microprocessor, an ASIC, a FPGA, a controller, a microcontroller, etc.) and can be one processor or a plurality of processors that are operatively connected. The memory 1236 can include one or more non-transitory computer-readable storage media, such as RAM, ROM, EEPROM, EPROM, one or more memory devices, flash memory devices, etc., and combinations thereof.

The memory 1236 can store information that can be accessed by the one or more processors 1234. For instance, the memory 1236 (e.g., one or more non-transitory computer-readable storage mediums, memory devices) can store data 1238 that can be obtained, received, accessed, written, manipulated, created, and/or stored. The data 1238 can include, for instance, any of the data and/or information as described herein. In some implementations, the machine learning computing system 1232 can obtain data from one or more memory device(s) that are remote from the machine learning computing system 1232.

The memory 1236 can also store computer-readable instructions 1240 that can be executed by the one or more processors 1234. The instructions 1240 can be software written in any suitable programming language or can be implemented in hardware. Additionally, or alternatively, the instructions 1240 can be executed in logically and/or virtually separate threads on processor(s) 1234.

For example, the memory 1236 can store instructions 1240 that when executed by the one or more processors 1234 cause the one or more processors 1234 to perform any of the operations and/or functions described herein, including, for example, the operations and functions of any of the systems/ apparatuses described herein, one or more portions of the methods/processes described herein, and/or any other functions or processes.

In some implementations, the machine learning computing system 1232 includes one or more server computing devices. If the machine learning computing system 1232 includes multiple server computing devices, such server computing devices can operate according to various computing architectures, including, for example, sequential computing architectures, parallel computing architectures, or some combination thereof.

Additionally, or alternatively, to the model(s) 1216 at the computing system 1202, the machine learning computing system 1232 can include one or more machine-learned models 1242. As examples, the machine-learned models 1242 can be or can otherwise include various machine-learned models such as, for example, neural networks (e.g., deep neural networks), support vector machines, decision trees, ensemble models, k-nearest neighbors models, Bayesian networks, or other types of models including linear models and/or non-linear models. Example neural networks include feed-forward neural networks, recurrent neural networks (e.g., long short-term memory recurrent neural networks), convolutional neural networks, or other forms of neural networks.

As an example, the machine learning computing system 1232 can communicate with the computing system 1202 according to a client-server relationship. For example, the machine learning computing system 1232 can implement the machine-learned models 1242 to provide a web service to the computing system 1202. For example, the web service can provide the functions and operations of the optical sensing described herein.

Thus, machine-learned models 1216 can be located and used at the computing system 1202 and/or machine-learned models 1242 can be located and used at the machine learning computing system 1232.

In some implementations, the machine learning computing system 1232 and/or the computing system 1202 can train the machine-learned models 1216 and/or 1242 through use of a model trainer 1244. The model trainer 1244 can train the machine-learned models 1216 and/or 1242 using one or more training or learning algorithms. One example training technique is backwards propagation of errors. In some implementations, the model trainer 1244 can perform supervised training techniques using a set of labeled training data. In other implementations, the model trainer 1244 can perform unsupervised training techniques using a set of unlabeled training data. The model trainer 1244 can perform a number of generalization techniques to improve the generalization capability of the models being trained. Generalization techniques include weight decays, dropouts, or other techniques.

In particular, the model trainer 1244 can train a machine-learned model 1216 and/or 1244 based on a set of training data 1246. The training data 1246 can include, for example, labelled input data and/or fused data indicative of electrical signals, wavelengths, etc. The model trainer 1244 can be implemented in hardware, firmware, and/or software controlling one or more processors.

The computing system 1202 can also include a communication interface 1214 used to communicate with one or more systems or devices, including systems or devices that are remotely located from the computing system 1202. The communication interface 1214 can include any circuits, components, software, etc. for communicating with one or more networks 1250. In some implementations, the communication interface 1214 can include, for example, one or more of a communications controller, receiver, transceiver, transmitter, port, conductors, software and/or hardware for communicating data. Similarly, the machine learning computing system 1232 can include a communication interface 1248.

The network(s) 1250 can be any type of network or combination of networks that allows for communication between devices. In some embodiments, the network(s) can include one or more of a local area network, wide area network, the Internet, secure network, cellular network, mesh network, peer-to-peer communication link and/or some combination thereof and can include any number of wired or wireless links. Communication over the network(s) can be accomplished, for instance, via a network interface using any type of protocol, protection scheme, encoding, format, packaging, etc.

FIG. 12 illustrates one example computing system 1200 that can be used to implement the present disclosure. Other computing systems can be used as well. For example, in some implementations, the computing system 1202 can include the model trainer 1244 and the set of training data 1246. In such implementations, the machine-learned models 1216 can be both trained and used locally at the computing system 1202. As another example, in some implementations, the computing system 1202 is not connected to other computing systems.

In addition, components illustrated and/or discussed as being included in one of the computing systems 1202 or 1232 can instead be included in another of the computing systems 1202 or 1232. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

Various means can be configured to perform the methods, operations, and processes described herein. For example, any of the systems and apparatuses (e.g., optical sensing apparatus and related circuitry) can include unit(s) and/or other means for performing their operations and functions described herein. In some implementations, one or more of the units may be implemented separately. In some implementations, one or more units may be a part of or included in one or more other units. These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry, for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data register(s), database(s), and/or other suitable hardware.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An optical sensing apparatus, comprising:
a photodetector array comprising a plurality of photodetectors;
first circuitry or one or more processing devices configured to:
receive one or more electrical signals representing an optical signal received by a first subset of the plurality of photodetectors;
determine, based on the one or more electrical signals, a region of interest (ROI) in the photodetector array to receive the optical signal, wherein determining the region of interest further comprises determining, based on a distribution of electrical signal strengths across the first subset of the plurality of photodetectors generated in response to receiving the optical signal, a size of the region of interest in the photodetector array; and
deactivate, based on the determined region of interest, a second subset of the plurality of photodetectors of the photodetector array.

2. The optical sensing apparatus of claim 1, wherein determining the region of interest in the photodetector array further comprises determining, based on the one or more electrical signals, a ROI-center photodetector of the first subset of the plurality of photodetectors representing a center of the region of interest.

3. The optical sensing apparatus of claim 2, wherein determining the ROI-center photodetector further comprises determining the ROI-center photodetector based on a distribution of electrical signal strengths across the first subset of the plurality of photodetectors generated in response to receiving the optical signal.

4. The optical sensing apparatus of claim 1, wherein determining the region of interest in the photodetector array further comprises dynamically changing the region of interest in response to updated optical signal received by the photodetector array.

5. The optical sensing apparatus of claim 1, wherein the plurality of photodetectors comprise a third subset of photodetectors representing a region for receiving an interference optical signal.

6. The optical sensing apparatus of claim 5, wherein the first subset of photodetectors and the third subset of photodetectors include one or more common photodetectors representing an overlap to receive the optical signal and the interference optical signal.

7. The optical sensing apparatus of claim 5, wherein the first circuitry or the one or more processing devices are configured to:
receive one or more interference electrical signals representing the interference optical signal received by the third subset of photodetectors;
determine one or more calibrated electrical signals based on (i) the one or more electrical signals representing the optical signal received by the first subset of the plurality of photodetectors and (ii) the one or more interference electrical signals; and
provide the one more calibrated electrical signals for output.

8. The optical sensing apparatus of claim 1, wherein the optical sensing apparatus further comprises:
a substrate, wherein the photodetector array is supported by the substrate;
one or more lenses over the photodetector array, wherein the one or more lenses are composed of silicon; and
an encapsulation layer over the one or more lenses and composed of a second material having a second refractive index between 1.3 to 1.8,
wherein each photodetector of the photodetector array comprises a light-absorption material including germanium.

9. The optical sensing apparatus of claim 1, further comprising:
a first substrate comprising a first material, wherein the photodetector array is formed on or at least partially in the first substrate, wherein each photodetector of the photodetector array comprises a second material configured to receive an optical signal and convert the optical signal to photo-current;
a second substrate bonded to the first substrate, wherein the second substrate comprises the first material;
second circuitry formed in the second substrate, where the second circuitry is configured to convert the photo-current and to an analog voltage output for processing; and
a third substrate coupled to the first substrate or the second substrate, wherein the third substrate comprises third circuitry configured to process the analog voltage output to generate a digital output,
wherein the second circuitry or the third circuitry includes a portion of the first circuitry.

10. The optical sensing apparatus of claim 1, wherein the plurality of photodetectors comprise a third subset of photodetectors representing a region for receiving an optical signal having a different wavelength with the optical signal received by the first subset of the plurality of photodetectors.

11. An optical sensing apparatus, comprising:
a photodetector array, comprising:
a first ROI, comprising one or more first photodetectors, configured to detect a first optical signal reflected from a target object and output one or more first electrical signals, wherein the one or more first electrical signals comprise one or more first optical currents generated by the one or more first photodetectors;
a second ROI, comprising one or more second photodetectors, configured to detect a second optical signal reflected from a non-target object and output one or more second electrical signals, wherein the one or more second electrical signals comprise one or more second optical currents generated by the one or more second photodetectors, and circuitry configured to:
process the one or more first electrical signals and the one or more second electrical signals to generate one or more calibrated electrical signals; and
output the one or more calibrated electrical signals;
wherein the circuitry comprises:
an analog-to-digital converter circuitry coupled to the photodetector array, configured to convert the one or more first optical currents to one or more first digital output signals; and convert the one or more second optical currents to one or more second digital output signals; and
a calculation module, coupled to the analog-to-digital converter circuitry, configured to determine the one or more calibrated electrical signals based on the one or more first digital output signals and the one or more second digital output signals.

12. The optical sensing apparatus of claim 11, wherein the first ROI and the second ROI are partially overlapped, and wherein the one or more second photodetectors include at least one photodetector of the one or more first photodetectors.

13. The optical sensing apparatus of claim 11, wherein the non-target object is a reflecting-surface of the optical sensing apparatus.

14. The optical sensing apparatus of claim 11, wherein the analog-to-digital converter circuitry further comprises:
   a transimpedance amplifier coupled to the photodetector array, configured to convert the first one or more optical currents to one or more first analog output signals, and convert the one or more second optical currents to one or more second analog output signals; and
   an analog-to-digital convertor, coupled to the transimpedance amplifier, configured to convert the one or more first analog output signals to the one or more first digital output signals, and convert the one or more second analog output signals to the one or more second digital output signals.

15. The optical sensing apparatus of claim 14, wherein the optical sensing apparatus further comprises a switching array, and wherein the transimpedance amplifier is coupled to the photodetector array through the switching array.

16. An optical sensing method, comprising:
   receiving one or more electrical signals representing an optical signal received by a first subset of a plurality of photodetectors of a photodetector array;
   determining, based on the one or more electrical signals, a region of interest in the photodetector array to receive the optical signal, wherein determining the region of interest further comprises determining, based on a distribution of electrical signal strengths across the first subset of the plurality of photodetectors generated in response to receiving the optical signal, a size of the region of interest in the photodetector array;
   and deactivating, based on the determined region of interest, a second subset of the plurality of photodetectors of the photodetector array.

\* \* \* \* \*